United States Patent
Tobita et al.

(10) Patent No.: US 6,327,240 B1
(45) Date of Patent: Dec. 4, 2001

(54) OPTICAL DISC AND OPTICAL DISC DRIVE

(75) Inventors: Minoru Tobita, Tokyo; Shigemi Maeda, Nara; Toshiaki Hioki, Gifu; Michio Matsuura, Hyogo, all of (JP)

(73) Assignees: Sony Corporation, Tokyo; Sharp Kabushiki Kaisha; Sanyo Electric Co. Ltd., both of Osaka; Fujitsu Limited, Kanagawa, all of (JP)

( * ) Notice: Subject to any disclaimer, the term of this patent is extended or adjusted under 35 U.S.C. 154(b) by 0 days.

(21) Appl. No.: 09/100,406

(22) Filed: Jun. 19, 1998

(30) Foreign Application Priority Data

Jun. 19, 1997 (JP) ............................................... P09-163150

(51) Int. Cl.$^7$ ...................................................... G11B 7/24
(52) U.S. Cl. .................................... 369/275.3; 369/275.4; 369/13
(58) Field of Search .......................... 369/275.4, 275.1, 369/275.3, 124.01, 44.13, 278, 53.11, 59.1, 13, 32, 44.26, 44.29

(56) References Cited

U.S. PATENT DOCUMENTS

| | | | |
|---|---|---|---|
| 5,377,178 | * 12/1994 | Saito et al. | 369/124 |
| 5,566,141 | 10/1996 | Yamaguchi et al. | 369/32 |
| 5,604,726 | 2/1997 | Karube | 369/275.4 |
| 5,715,217 | * 2/1998 | Fuji | 369/44.26 |
| 5,805,565 | * 9/1998 | Miyamoto et al. | 369/275.4 |
| 5,844,883 | * 12/1998 | Kanno et al. | 369/275.4 |
| 5,852,599 | * 12/1998 | Fuji | 369/275.4 |
| 5,940,364 | * 8/1999 | Ogata et al. | 369/275.4 |
| 6,069,869 | * 5/2000 | Nagasawa et al. | 369/275.3 |
| 6,118,752 | * 9/2000 | Miyagawa et al. | 369/275.3 |
| 6,147,961 | * 11/2000 | Nagasawa et al. | 369/275.3 |

FOREIGN PATENT DOCUMENTS

| | | |
|---|---|---|
| 0628952 | 12/1994 | (EP) . |
| 0 662 685 | 7/1995 | (EP) . |
| 0727779 | 8/1996 | (EP) . |
| 0751504 | 1/1997 | (EP) . |
| 0 818 778 | 1/1998 | (EP) . |
| 04-195939 | 7/1992 | (JP) . |
| 09-102143 | 4/1997 | (JP) . |

* cited by examiner

*Primary Examiner*—Ali Neyzari
(74) *Attorney, Agent, or Firm*—Sonnenschein, Nath & Rosenthal

(57) ABSTRACT

An optical disc and an optical disc drive for the optical disc are provided which are suitable for recording data with a high density.

The optical disc D uses both lands and grooves as recording tracks. Each of the tracks consists of one address segment and forty five data segments. The address segment is wobbled at one side thereof. Each of the data segments is a DC groove. The address segment records an address information including a sync signal, frame address, track address and CRC, a tilt pattern and a clock mark. The clock mark is adapted to reflect laser beam in one amount before the mark and in another amount after the mark. The tilt pattern has a different track pitch from those in other areas. The data segments record data magneto-optically.

3 Claims, 18 Drawing Sheets

| ADDRESS | BINARY CODE | GRAY CODE |
|---|---|---|
| 0 | 00000000 | 00000000 |
| 1 | 00000001 | 00000001 |
| 2 | 00000010 | 00000011 |
| 3 | 00000011 | 00000010 |
| 4 | 00000100 | 00000110 |
| 5 | 00000101 | 00000111 |
| 6 | 00000110 | 00000101 |
| 7 | 00000111 | 00000100 |
| 8 | 00001000 | 00001100 |
| 9 | 00001001 | 00001101 |
| 10 | 00001010 | 00001111 |
| 11 | 00001011 | 00001110 |
| 12 | 00001100 | 00001010 |
| 13 | 00001101 | 00001011 |
| 14 | 00001110 | 00001001 |
| 15 | 00001111 | 00001000 |
| . | . | . |
| . | . | . |
| . | . | . |
| 254 | 11111110 | 10000001 |
| 255 | 11111111 | 10000000 |

FIG.7

OPTICAL DISC AND OPTICAL DISC DRIVE

BACKGROUND OF THE INVENTION

1. Field of the Invention

The present invention relates to an optical disc having formed thereon lands and grooves, which form together a data recording track, and an optical disc drive for the optical disc.

2. Description of Related Art

Well-known data recording media include optical discs such as a magneto-optical type, phase-change type and the like. They include a read-only ROM disc, a recordable disc, a recordable/reproducible RAM disc, a so-called partial ROM disc having a ROM area and a RAM area, etc.

In addition, some of the optical discs called land/groove recording type optical discs, have been proposed which are designed to record data at both lands and grooves for a larger capacity of data storage.

In these conventional optical discs, a recording track is wobbled to provide a servo control information and address information (ADIP) for data recording and reproduction. In the conventional optical discs, however, a recorded data, when reproduced, will be deteriorated due to an amount of light varied, and a light polarizing direction disturbed, by the wobbling, and thus will show a poor signal-to-noise ratio. The influence of this wobbling on a data recording into an optical disc with a high density using a large NA, for example, is not negligible.

For a higher density of data recording into an optical disc, a clock mark is necessary which is highly reliable and can reproduce a data-independent clock. FIG. 1 shows a conventional clock mark by way of example. It is inserted in a wobble signal. The clock mark is formed as a pattern having a greater length than the diameter of a focused laser spot and wobbled towards the outer and inner circumferences, alternately, radially of an optical disc, so that a varied amount of light will result in an S-shaped signal waveform. Thus, a clock reproduced from such a clock mark is not influenced by MTF of a reproducing optical system and has a good signal-to-noise ratio.

For detecting a clock from such a clock mark, a radial push-pull signal is used. Thus, the clock generated from the clock mark will be affected by a tracking offset and radial tilt of an optical disc. Therefore, no stable clock can be reproduced from the clock mark if a tracking error or the like takes place.

Also, it is desired to improve the accuracy of clocking by increasing the number of clocks. However, a clock mark having a correspondingly increased length will greatly cause data to be recorded with a greater redundancy, thus no higher density of data recording can be attained.

Further, for a higher density of data recording into an optical disc, it is desired to reduce the thickness of the substrate of an optical disc while increasing the NA for irradiation to the optical disc. However, such a reduced thickness of the optical disc substrate will greatly affect the disc substrate itself. Namely, the disc substrate will be deflected or distorted due to a variation of environmental conditions. In addition, the manufacturing cost for such an optical disc with a reduced substrate thickness will be greater because it will include costs for prevention of such environmental influences. To avoid such deformation of the optical disc, an optical disc drive may incorporate a disc tilt detecting mechanism to correct a relative angle between a laser beam and main side of an optical disc. However, the disc tilt detecting mechanism will add to the manufacturing costs for such an optical disc drive.

SUMMARY OF THE INVENTION

Accordingly, it is an object of the present invention to overcome the above-mentioned drawbacks of the prior art by providing an optical disc suitable for data recording with a high density, and an optical disc drive for the optical disc.

The above object can be accomplished by providing, according to the present invention, an optical disc having address areas discretely disposed on only one of two walls forming together a groove and in each of which an address information is recorded by wobbling, and a data area defined between two walls, not wobbled, of the groove.

According to another aspect of the present invention, an optical disc is provided in which an address information is recorded, by wobbling, on only one of two walls forming together a groove to physically isolate recorded data from an area where the address information is recorded.

According to another aspect of the present invention, an optical disc is provided which has tilt pattern areas discretely disposed and different in radial spatial frequency from other areas on a recording track.

According to another aspect of the present invention, an optical disc is provided in which an address information is recorded on only one of two walls forming together a groove, recorded data is physically isolated from the area where the address information is recorded, and a reflected light of a laser beam irradiated to a tilt pattern area becomes radially asymmetrical when a relative angle of the laser beam irradiated to a recording track varies radially.

According to another aspect of the present invention, an optical disc is provided which has clock areas discretely disposed on a recording track and different in light reflection from tangential forward and rearward portions of a recording track.

According to another aspect of the present invention, an optical disc is provided in which a reflected light of a laser beam irradiated to a clock area is different in amount of light before the clock area from after the clock area. A tangential push-pull signal is detected, based on the difference in amount of light to reproduce a clock.

According to another aspect of the present invention, an optical disc is provided which has clock areas discretely disposed on a recording track and different in light reflection from tangential forward and rearward portions of a recording track.

According to another aspect of the present invention, an optical disc is provided in which a tangential push-pull signal is detected based on a difference in amount of reflected laser beam to reproduce a clock and a reflected light of a laser beam irradiated to a tilt pattern area becomes radially asymmetrical when a relative angle of the laser beam irradiated to a recording track varies radially.

According to another aspect of the present invention, an optical disc is provided which has address areas discretely disposed and in which an address information is recorded by wobbling on only one of the two walls forming together a groove, data area defined between two walls, not wobbled, of the groove, and clock areas discretely disposed and different in light reflection from tangential forward and rearward portions of a recording track.

According to another aspect of the present invention, an optical disc is provided in which an address information is recorded on only one of two walls forming together a groove, recorded data is physically isolated from the area where the address information is recorded, and a tangential push-pull signal is detected, based on the difference in amount of reflected light of a laser beam irradiated to a clock area to reproduce a clock.

According to another aspect of the present invention, an optical disc is provided which has tilt pattern areas discretely disposed and different in radial spatial frequency from other areas on a recording track.

According to another aspect of the present invention, an optical disc is provided in which an address information is recorded on only one of two walls forming together a groove, recorded data is physically isolated from the area where the address information is recorded, a tangential push-pull signal is detected based on the varied amount of reflected light of a laser light irradiated to a clock area to reproduce a clock, and a reflected light of a laser beam irradiated to a tilt pattern area becomes radially asymmetrical when a relative angle of the laser beam irradiated to a recording track varies radially.

The above object can also be accomplished by providing an optical disc drive which is to play an optical disc having formed concentrically or spirally thereon lands and grooves forming together a data recording track and in which an address information is recorded on only one of the two walls forming a groove by wobbling and which has address areas discretely disposed and data area disposed between two walls, not wobbled, of the groove, and comprises a recording/reproducing means for reproducing an address information from the optical disc, and recording or reproducing data based on the address information.

According to another aspect of the present invention, an optical disc drive is provided in which a recording/reproducing means records and reproduces data into and from a data area physically isolated from an area in which the address information is recorded.

According to another aspect of the present invention, an optical disc drive is provided which is to play an optical disc which has formed concentrically or spirally thereon lands and grooves forming together a recording track, and address areas discretely disposed on only one of the two walls forming together a groove and in which an address information is recorded by wobbling, data area disposed between two walls, not wobbled, of the groove, and clock areas discretely disposed and different in light reflection from tangential forward and rearward portions of the recording track, and comprises a recording/reproducing means for detecting a tangential push-pull signal indicative of a tangential difference in amount of light of a laser beam irradiated to the clock area, reproducing an address information, and recording or reproducing data based on the address information, and a clock generating means for generating a clock for the above data.

According to another aspect of the present invention, an optical disc drive is provided in which a recording/reproducing means detects a tangential push-pull signal based on a varied amount of light of a laser beam irradiated to a clock area, and a clock generating means reproduces a clock.

According to another aspect of the present invention, an optical disc drive is provided which is to play an optical disc which has formed concentrically or spirally thereon lands and grooves forming together a data recording track, and address areas discretely disposed on only one of the two walls forming together a groove and in which an address information is recorded by wobbling, data area disposed between two walls, not wobbled, of the groove, and clock areas discretely disposed and different in light reflection from tangential forward and rearward portions of the recording track, and comprises a recording/reproducing means for detecting a tangential push-pull signal indicative of a tangential difference in amount of light of a laser beam irradiated to the clock area, reproducing an address information, and recording or reproducing data based on the address information, and a clock generating means for generating a clock for the above data.

According to another aspect of the present invention, an optical disc drive is provided in which a recording/reproducing means records and reproduces data into and from a data recording area physically isolated from an area in which an address information is recorded. Also an optical disc drive is provided in which a recording/reproducing means detects a tangential push-pull signal based on a difference in amount of light of a laser beam irradiated to a clock area and a clock generating means reproduces a clock. Further, an optical disc drive is provided in which a recording/reproducing means detects a radial push-pull signal indicative of a radial difference in amount of light of a laser beam.

BRIEF DESCRIPTION OF THE DRAWINGS

These objects and other objects, features and advantages of the present intention will become more apparent from the following detailed description of the present invention when taken in conjunction with the accompanying drawings, of which:

FIG. 7 shows a gray coding of an address information on the magneto-optical disc;

DETAILED DESCRIPTION OF THE PREFERRED EMBODIMENTS

Figure 1:
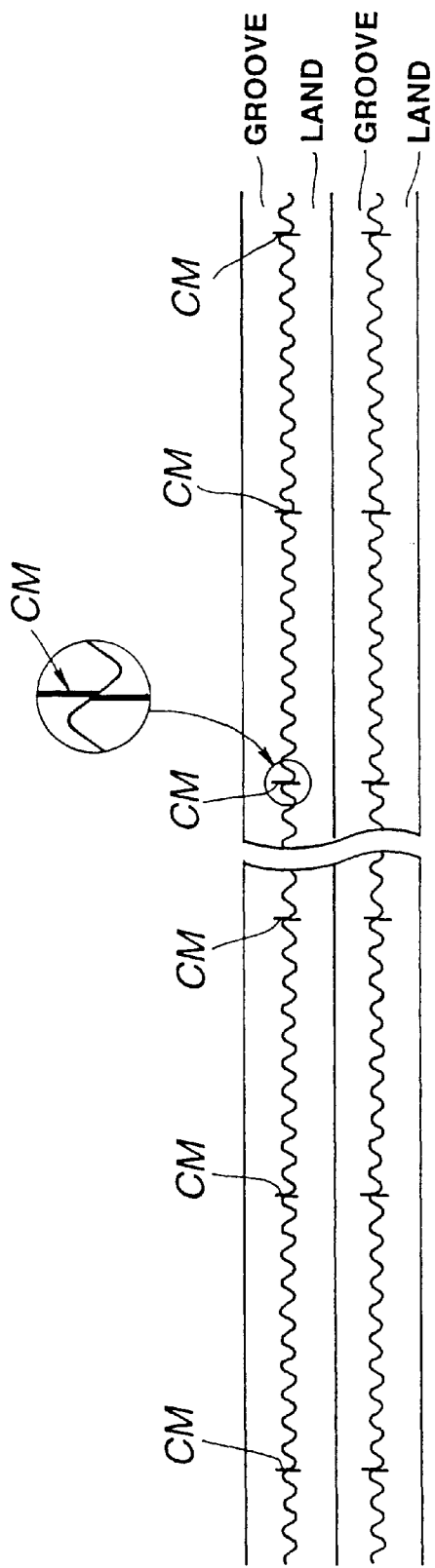
FIG. 1 schematically shows the configuration of a conventional clock mark.
Figure 2:
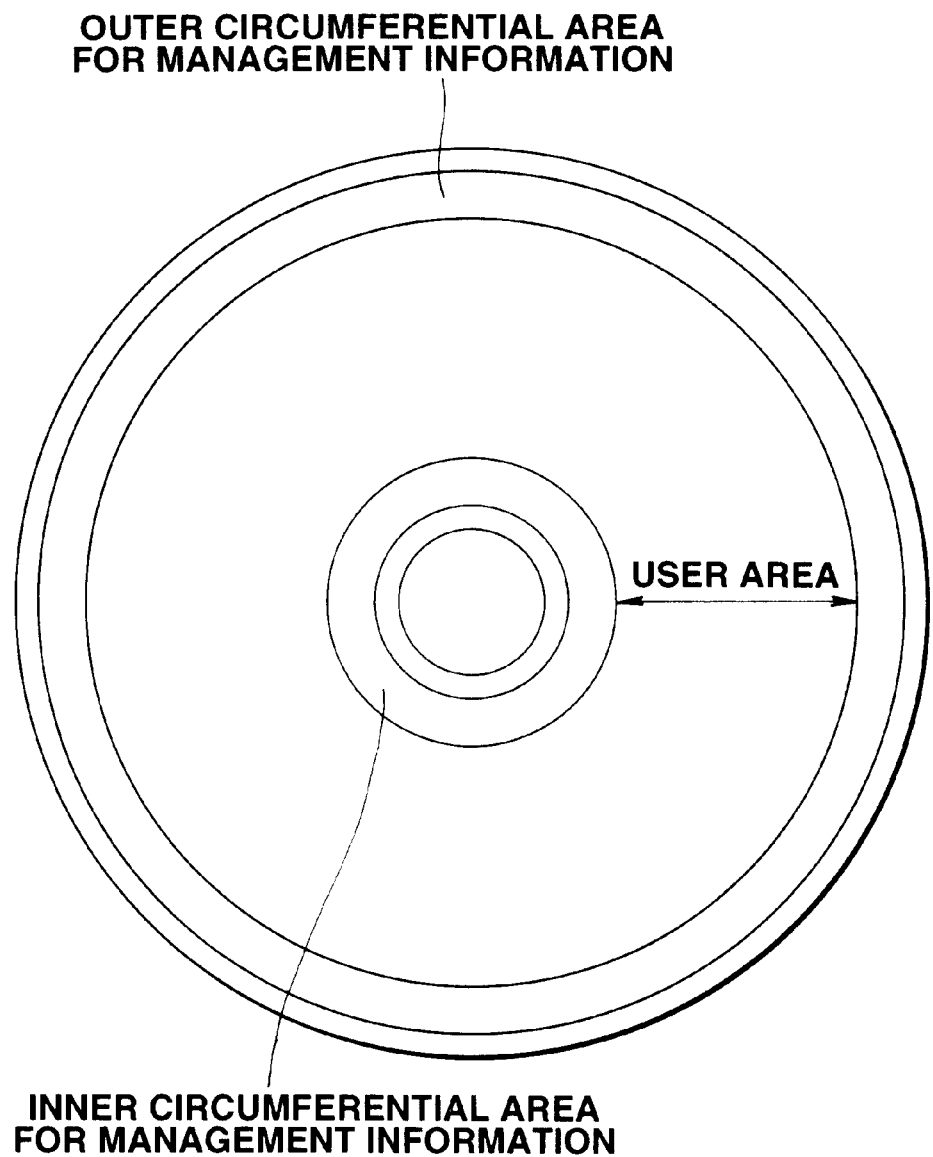
FIG. 2 schematically shows the configuration of an embodiment of the magneto-optical disc according to the present invention.

Referring now to FIG. 2, a magneto-optical disc (will be referred simply to "disc D" hereafter) of the present invention is illustrated. As shown, the disc D has management information areas formed along an outer circumference and inner circumference, respectively, thereof, for a predetermined number of tracks, respectively. Each of these management information areas comprises an area in which disc management information is recorded, a buffer area, a test area and others. Also the disc D has formed between the outer and inner management information areas thereof a user area into or from which a user records or reproduces data.

Figure 3:
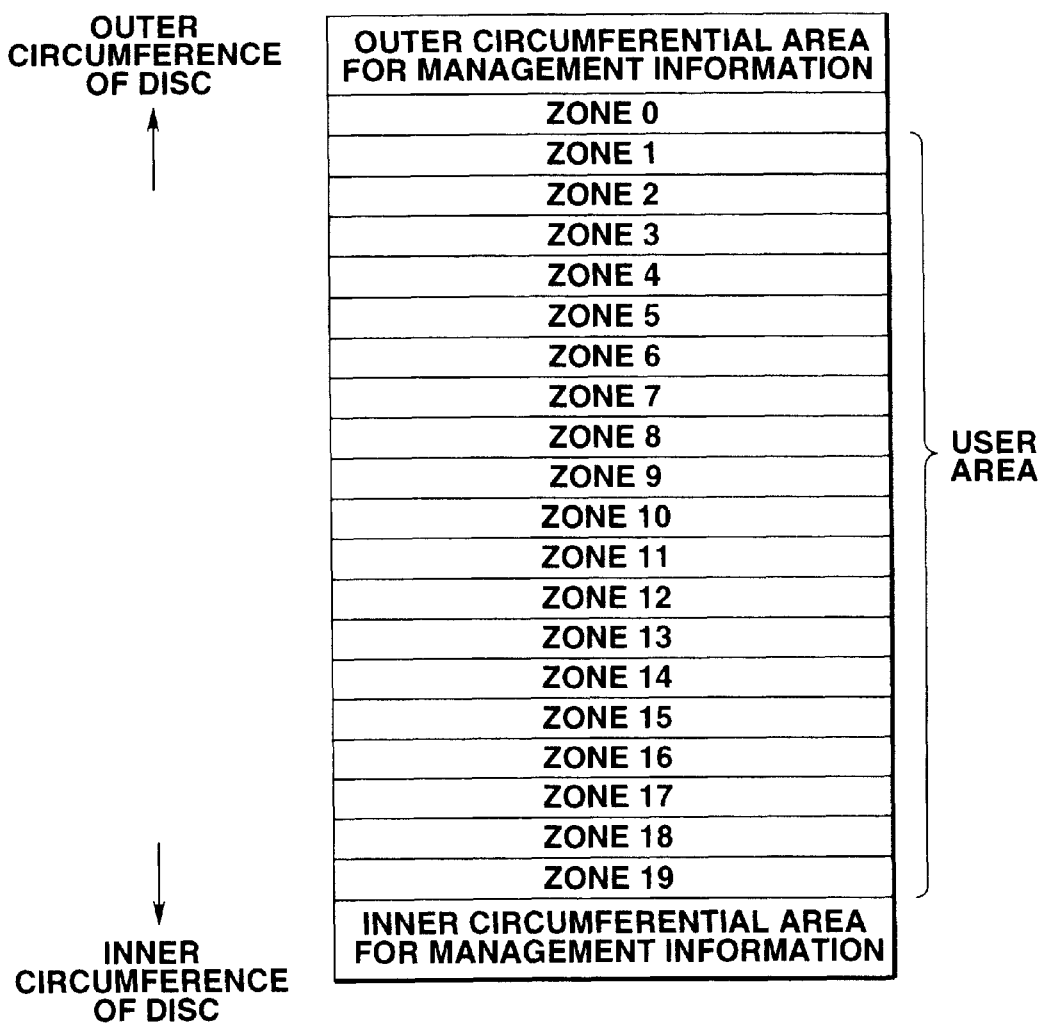
FIG. 3 schematically shows a zone mapping on the magneto-optical disc.

The user area is divided into twenty zones including a zone 0 to zone 19, for example, as shown in FIG. 3. The zone CAV or zone CLV method, for example, is used to record or reproduce data into or from such an optical disc D.

The configurations of tracks, frames and segments will be described with reference to FIGS. 4 and A to 5C.

Figure 4:
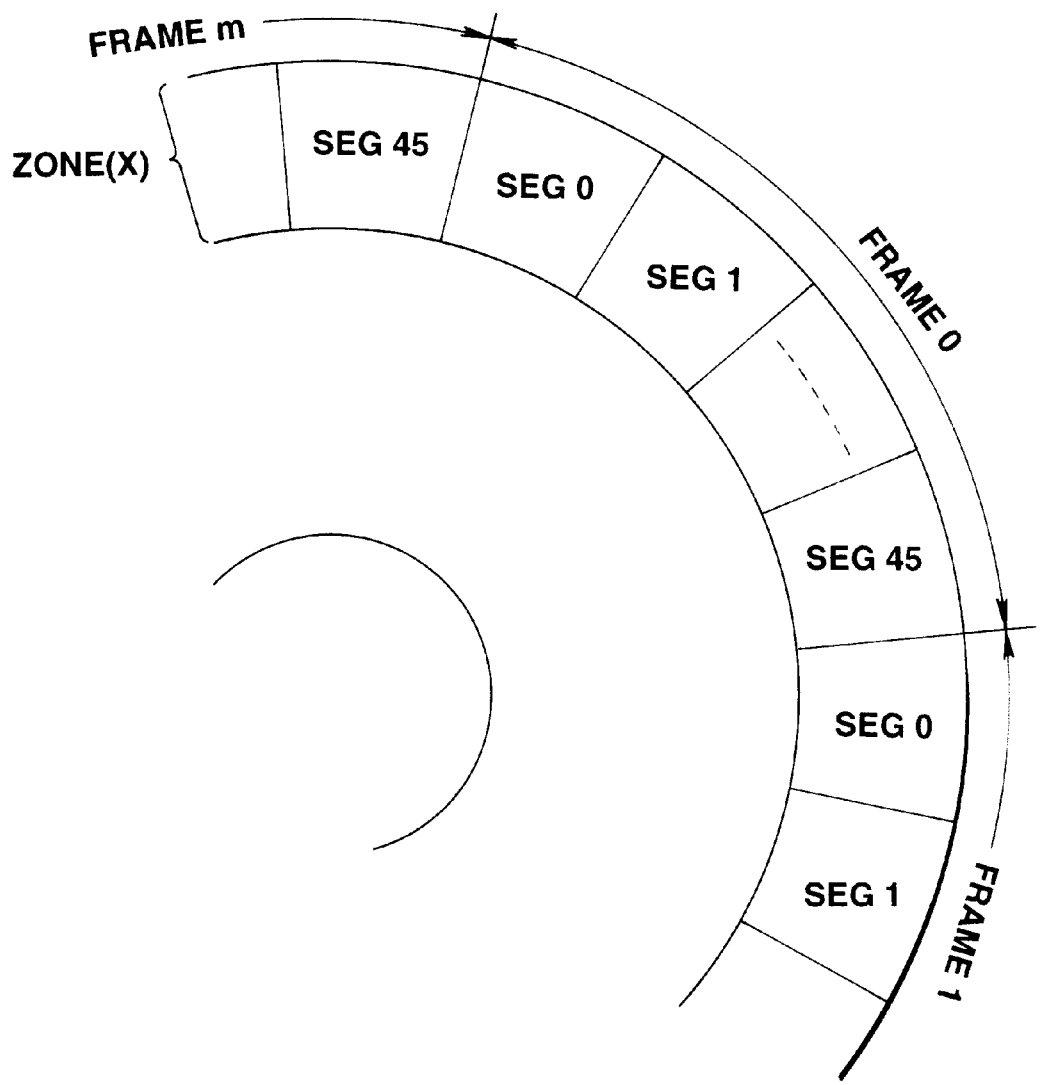
FIG. 4 schematically shows the configuration of a frame consisting of segments on the magneto-optical disc.
Figures 5A, 5B, 5C:
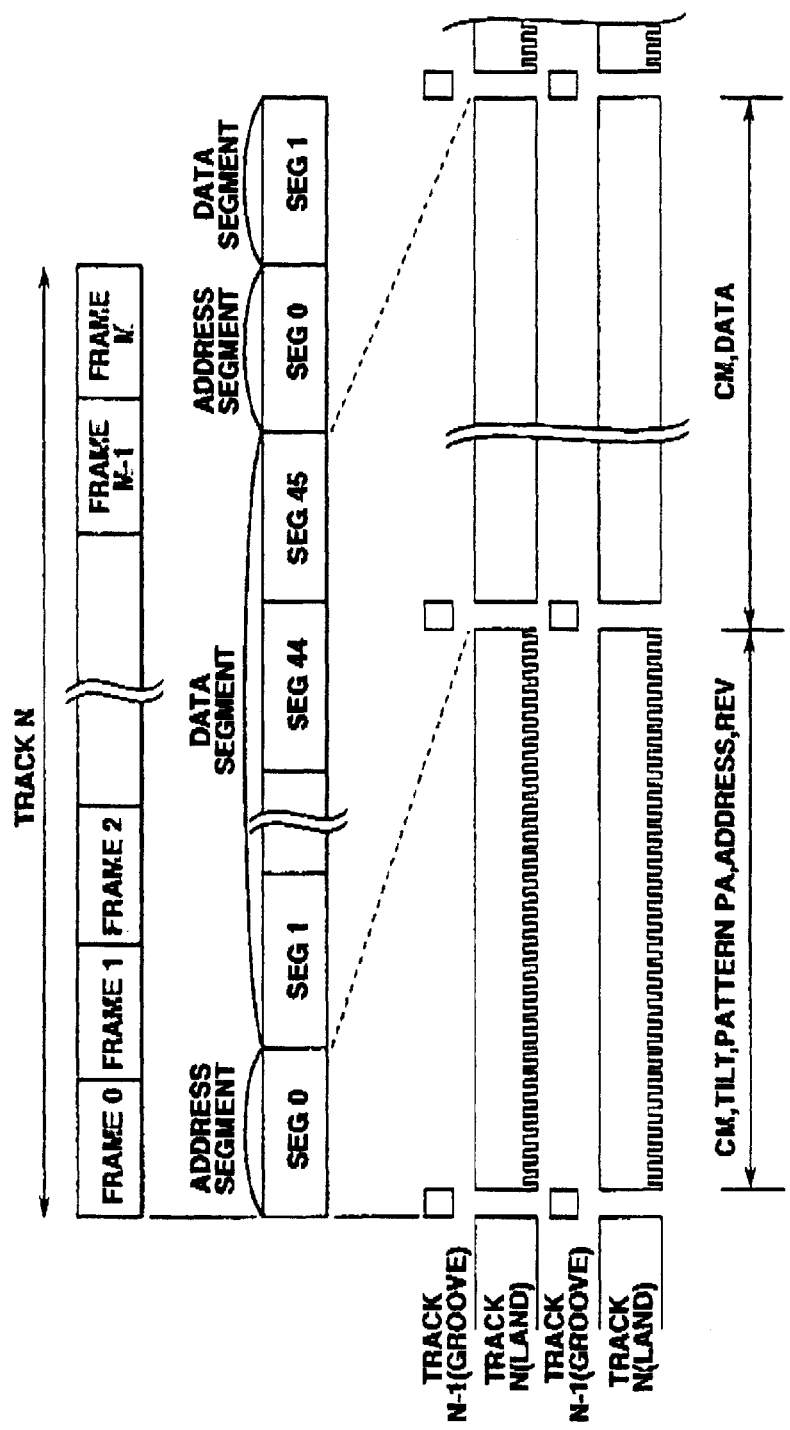
FIGS. 5A to 5C schematically show frames and segments on the magneto-optical disc.

FIG. 4 shows an arbitrary zone (X) consisting of frames and segments, and FIGS. 5A to 5C show the configurations of frames and segments of an predetermined track N of the zone (X). It should be appreciated that the tracks are formed concentrically or spirally and one lap of the disc D is taken as one track.

Each zone has a predetermined number of tracks formed radially thereon. The number of tracks in one zone may vary from one zone to another. Each track is divided into more than one frame as shown in FIG. 3 and FIG. 5A. It is assumed that the number of frames included in one track is an integer and all tracks included in the same zone have the same number of frames. In one zone, frames in one track are radially aligned with those in other tracks as shown in FIG. 4. Note that the number of frames in one track may vary from one track to another.

As shown in FIG. 4 and FIG. 5B, each frame is divided into forty six segments SEG0 to SEG45. Segments in different frames in different tracks in different zones count the same number, namely, forty six. Segments in one zone are radially aligned with those in other tracks. It should also be noted that one frame includes forty six segments in this embodiment of the present invention, to which however the present invention is not limited in number of segments.

The segments SEG0 to SEG45 include address segments and data segments. As shown in FIG. 5B, the segment SEG0 being the leading segment in a frame is an address segment and the other segments are data segments, for example.

As shown in FIG. 5C, the address segment records an address information, tilt pattern, preamble (PA), reserved data (Rev), etc. In the address segment, these information including an address are recorded on only one of two walls forming together a groove by wobbling, that is, by a so-called one-side wobbling. Also, in the disc D, a land and groove are used as recording tracks, so that when one of two walls of a groove is wobbled, an address is simultaneously recorded also on a land opposite to the wobbled wall. Thus, an address is recorded in tracks N and N+1, respectively, for example, by the same wobbling as shown in FIG. 5C. It should be appreciated that the addresses in the tracks N and N+1 are distinguished from each other with opposite signs for the addresses when reproduced.

Data segment records data by means of an irradiated laser beam and applied magnetic field, namely, by a magneto-optical recording method using a magnetic field modulation. The data segment has no address information, etc. recorded therein by wobbling. That is to say, the data segment lies in a so-called DC groove not wobbled. Also, the data segment has formed an area for prevention of an insufficient erasure at the time of an overwrite and an area for absorption of an offset due to a fluctuation of the recording power.

Further, a clock mark (CM) is provided at the beginning of each address segment as well as at the beginning of each data segment.

Next, an address information, preamble (PA), reserved data (Rev), etc. recorded in an address segment will be described below.

The address segment records a clock mark of 2.5 bits in data size, a tilt pattern of 5 bits, a preamble of 4 bits, an address information of 42 bits, and a reserved data of 11 bits.

The address information recorded into the address segment consists of a 4-bit sync signal (SYNC), an 8-bit frame address, a 16-bit track address, and a 14-bit error detection code (CRC).

As the frame address, track address and error detection code (CRC), data are bi-phase modulated to be DC-free. Therefore, they will have no influence on tracking.

The frame address is an address of the above-mentioned frame in which the address segment exists, and tangential with respect to the disc D. The track address is an address of the above-mentioned track in which the address segment exists, and radial with respect to the disc D. As the frame and track addresses, data are gray-coded. A binary code of 8 bits, for example, is gray-coded as shown in FIG. 7. Therefore, even if a traverse takes place, these addresses can be easily reproduced.

The error detection code is a data for detection of any error in these frame and track addresses. It should be noted that an error correction code, for example, may be recorded in the stead of the error detection code.

The sync signal is intended for synchronization of these frame address, etc., and it is unique for the bi-phase modulated frame address, etc. The sync signal has a pattern of "10001110" or "01110001", for example.

In such an address segment, a preamble is recorded before the 42-bit address information in the address segment. Also, a reserved data is recorded after the address information.

The address segment has recorded therein a clock mark (CM) and tilt pattern which will be described in detail later.

Next, data to be recorded into a data segment will be described below.

The data segment in each track records data magneto-optically using Kerr effect of laser beam, ferrimagnetic recording layer and magnetization characteristic, for example. That is to say, the data segment records main data the user of the disc D wants to record.

Figure 8:
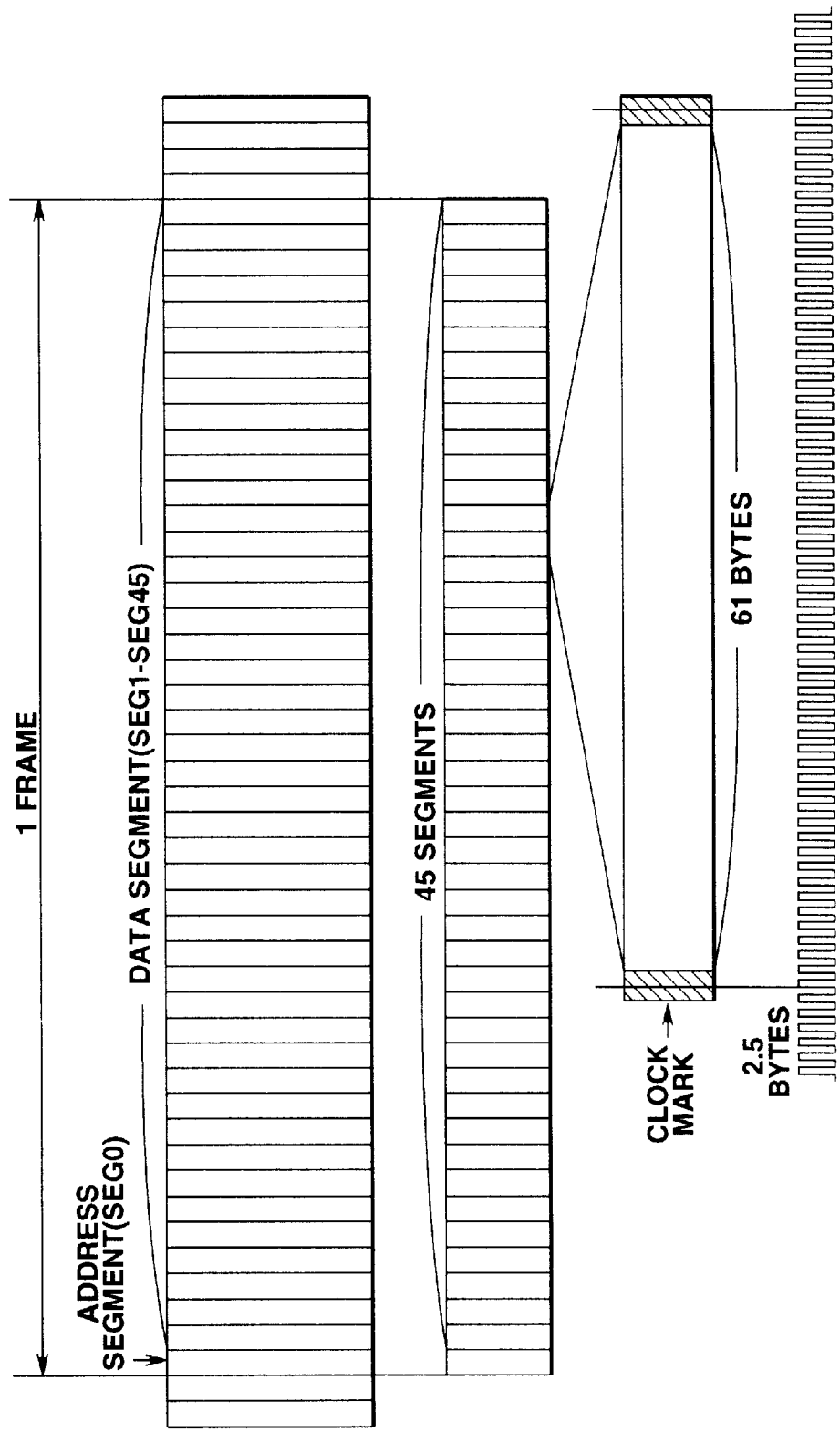
FIG. 8 shows dada recorded in data segments on the magneto-optical disc.

More particularly, the main data are recorded into the ones SEG1 to SEG45 of data segments forming one frame, except the segment SEG0 in which the address information, etc. are recorded, as shown in FIG. 8. Each segment records in an area the main data except for the clock mark provided at the beginning. The main data to be recorded into one segment is of 62 bytes, for example. The clock mark is of 2.5 bytes in size of main data. It should be noted that in one segment, data magneto-optically recorded is eight times larger than the address information recorded by wobbling in the above-mentioned address sector. Namely, an address is recorded in 61 bits by wobbling in one segment, and the main data is recorded in 61 bits by magneto-optically in one segment.

Such main data recorded in the data segment are recorded along with ECC and a header information in each sector being a unit of writing and reading. The disc D records main data in 2 kB (kilobytes) or 32 kB in each sector.

Figure 9:
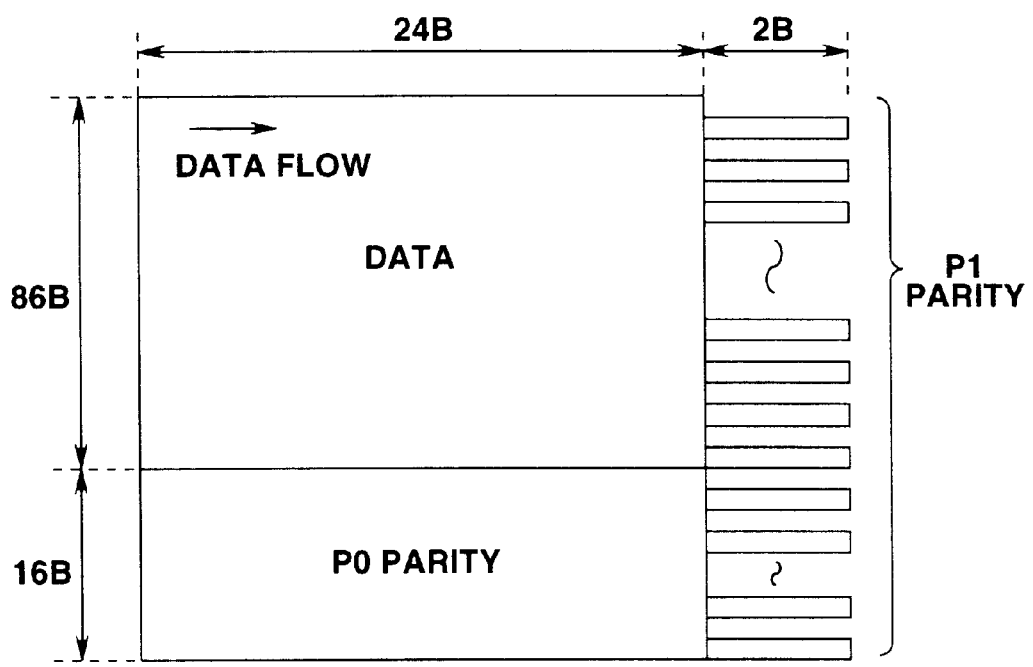
FIG. 9 is a schematic explanatory drawing of an ECC format of 2 kB/sector on the magneto-optical disc.

The sector format for recording 2 kB in each sector is such that a vertical parity bit (PO parity) of 16 bytes is added for each column to a DATA block of 24 bytes in horizontal direction and 86 bytes in vertical direction, for example, as shown in FIG. 9. Also, a horizontal parity bit of 2 bytes is added for every two lines to the DATA block and PO parity. Therefore, the sector format of 2 kB/sector has a total of 2,550 bytes $\{(86+16)\times(24+1)\}$. Also, the redundancy is 80.3% ($^{2048}/_{2550}$). The burst correction length is 400 bytes $\{(24+26)\times 8\}$.

Figure 10:
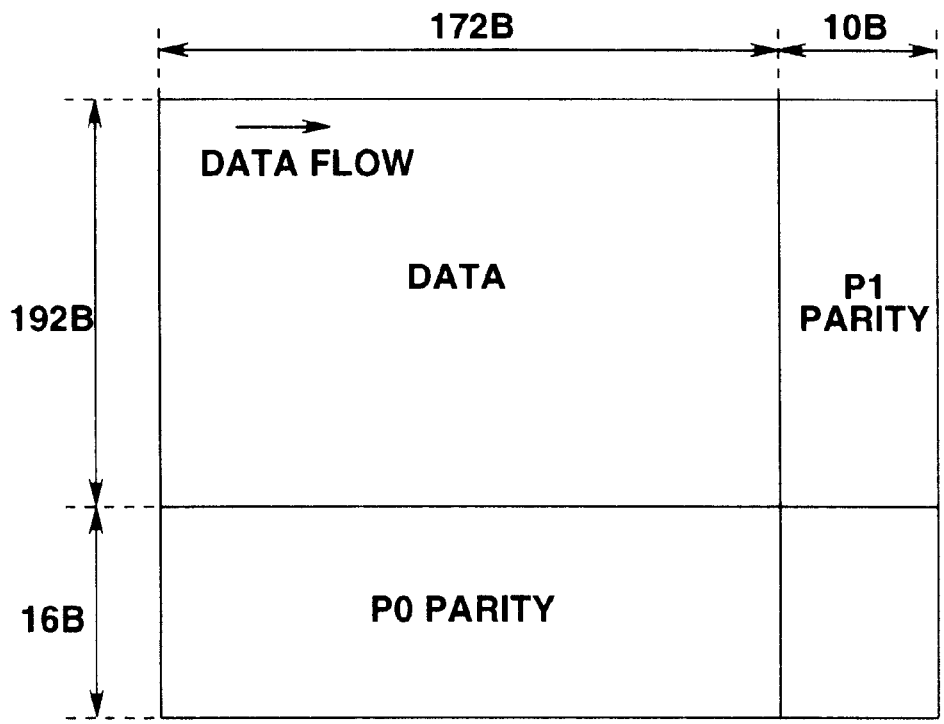
FIG. 10 is also a schematic explanatory drawing of an ECC format of 32 kB/sector on the magneto-optical disc.

The sector format for recording 32 kB in each sector is such that a vertical parity bit (PO parity) of 16 bytes is added for each column to a DATA block of 172 bytes in horizontal direction and 192 bytes in vertical direction, for example, as shown in FIG. 10. Also, a horizontal parity bit of 10 bytes is added for each line to the DATA block and PO parity. Therefore, the sector format of 32 kB/sector has a total of 37,856 bytes $\{(192+16)\times(172+10)\}$. Also, the redundancy is 87.2% ($^{33024}/_{37856}$).

Figure 11A:
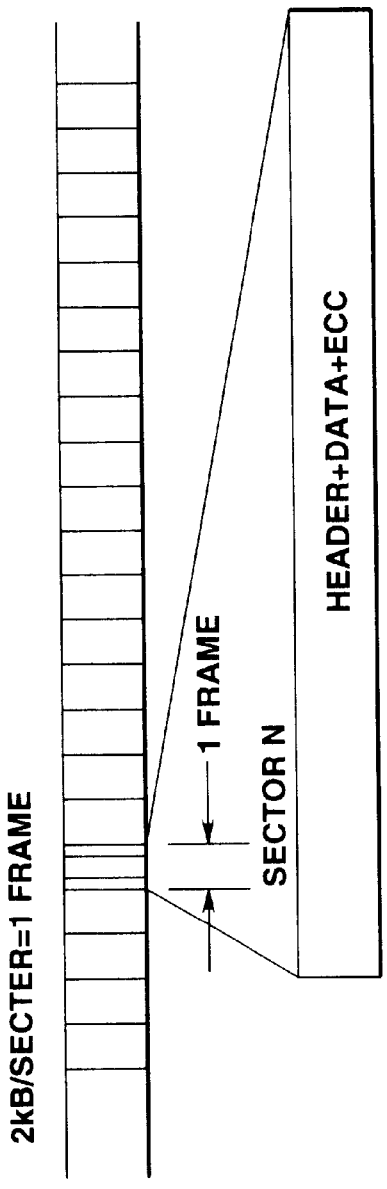
FIGS. 11A and 11B show a number of frames for recording data per sector in the ECC format of 2 kB/sector, and a one for recording data per sector in the ECC format of 32 kB/sector, respectively.
Figure 11B:
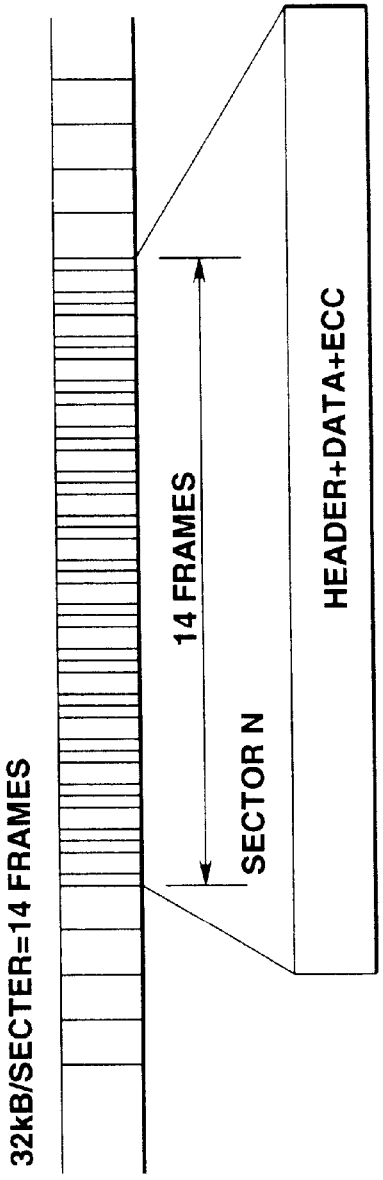

For recording main data into a track on the disc D in the sector format of 2 kB/sector, data. for one sector is recorded in one frame as shown in FIG. 11A. For recording of main data into a track on the disc D in the sector format of 32 kB/sector, data for one sector is recorded in 14 frames as shown in FIG. 11B.

Therefore, the disc D can record main data in either the 2 kB/sector or 32 kB/sector format so long as a sector size to be recorded into the management information area or the like, for example, is defined. That is to say, even when the 2 kB/sector format is used for recording a file of a relatively small data size such as a text information, or even when the 32 kB/sector format is used to record a file of a relatively large data size such as a video data, the disc D of the same physical format can be used, whereby the manufacturing costs and the like for the disc D can be reduced.

As having been described in the foregoing, the disc D records an address information, by wobbling, taking as an address sector only the leading one of the forty six segments forming together a frame while recording main data magneto-optically into the remaining not-wobbled data segments of a DC group. Therefore, on the disc D, data segments for recording the main data can physically be isolated from the address segment in which an address is recorded.

Thereby, the disc D can prevent the main data from being deteriorated due to a varied amount of light and disturbed light polarizing direction, so that the signal-to-noise ratio can be improved. With the disc D, an entire recording track may not be wobbled, which permits easy disc recording.

The disc D has been explained concerning an embodiment in which a wobbled address segment is provided at the beginning of a frame. It should be noted, however, that the present invention is not limited to this embodiment but an address segment may not be provided at the beginning of a frame. Also, the number of the address segments may not be limited to one for a frame, but a plurality of address segments may be provided.

Next, the tilt pattern of the aforementioned disc D will be described in detail with reference to the accompanying drawings.

Figure 6:
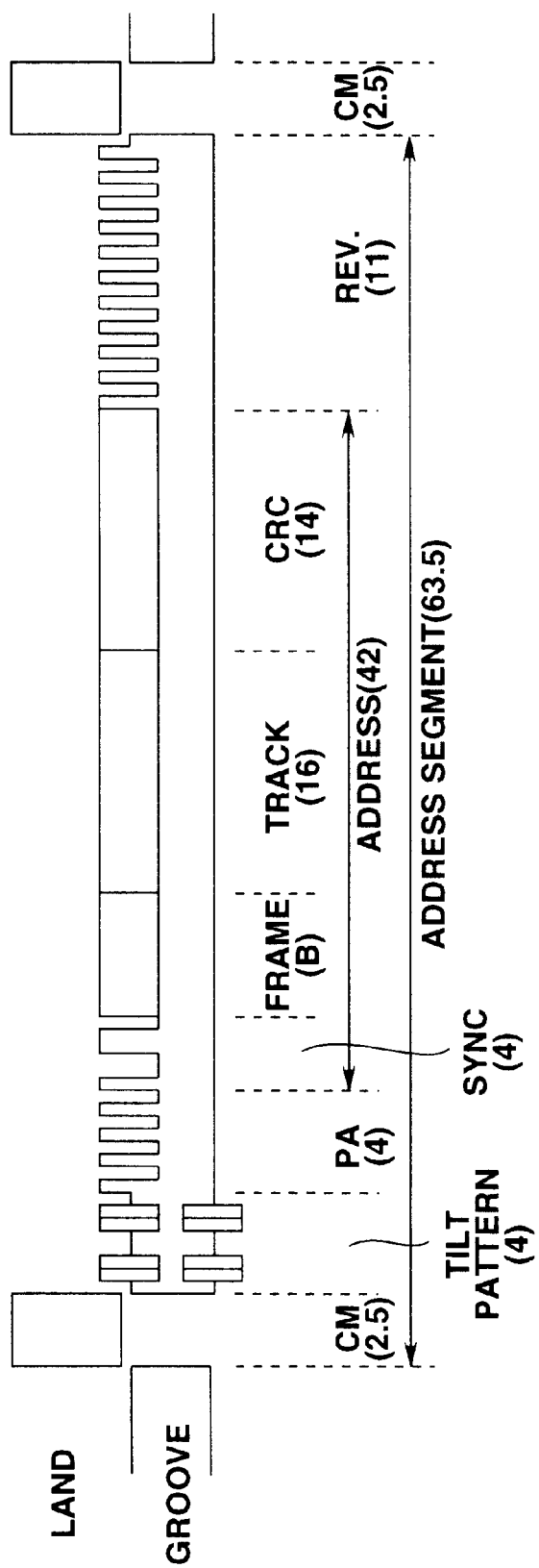
FIG. 6 schematically shows the configuration of an address segment of the magneto-optical disc.

As illustrated in FIG. 6, the disc D has a tilt pattern provided before an preamble recorded by wobbling in an address segment. While an address information is recorded by the one-side wobbling, the tilt pattern is formed by wobbling walls on opposite sides of a groove, for example, and narrowing the track pitch so that the spatial frequency in the wobbled walls is different from that in other areas of the land and groove.

When a laser beam is irradiated to the tilt pattern, a variation of relative tilt angle between the laser beam and track is detected with a radial push-pull signal used in a so-called tracking servo at the optical disc drive and the tilt can be corrected.

A variation of relative tilt angle takes place between a laser beam and track if a laser beam is not irradiated perpendicularly to a track because the disc D deflects or distorts or if the laser beam is not emitted perpendicularly to the track because the optical pick-up tilts.

A radial angle of the laser beam with respect to the disc D will be referred to simply as "tilt" hereinafter.

Figure 12:
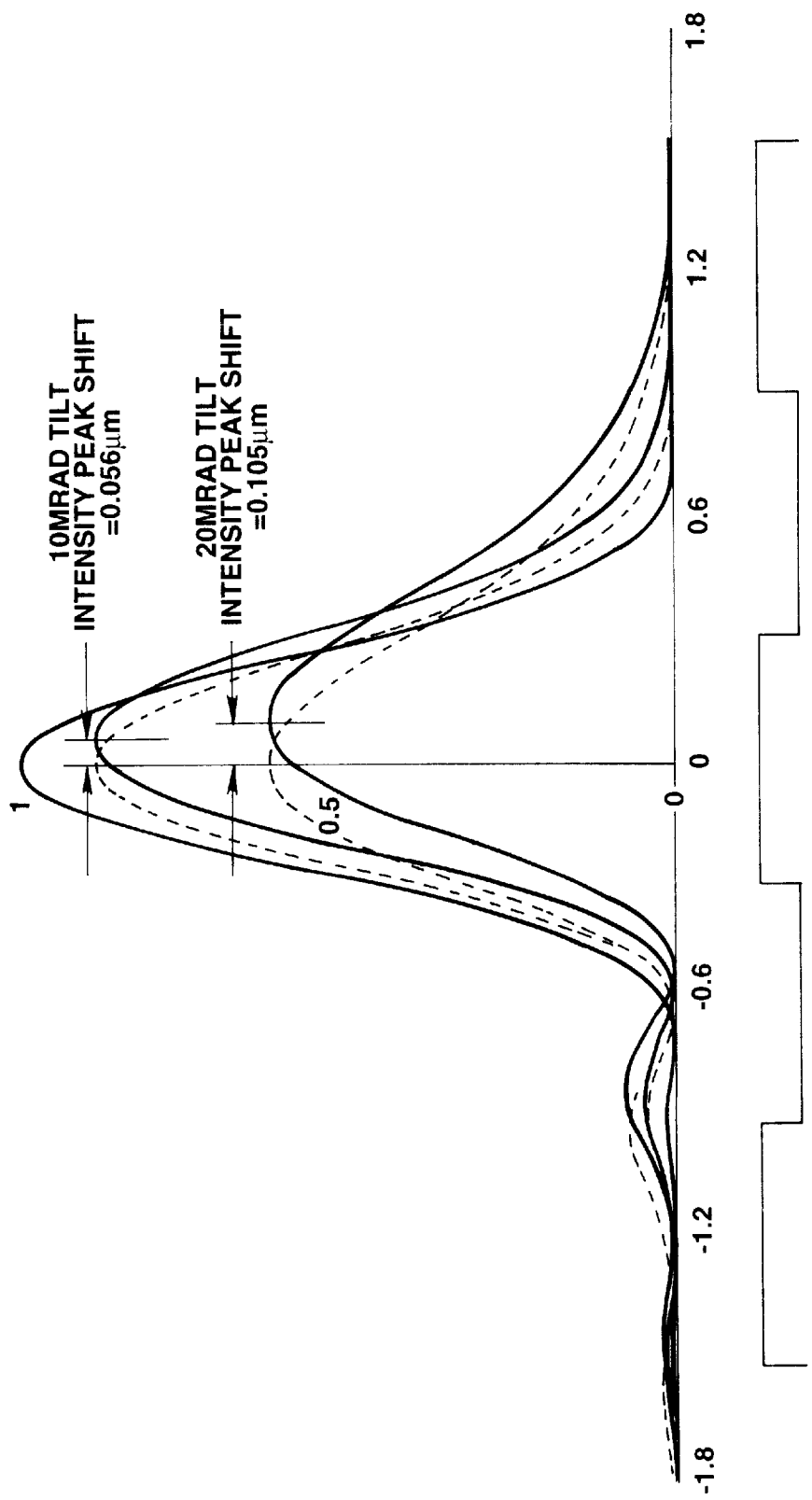
FIG. 12 shows a deviation of peak when the tracking offset is zero and the tilt varies.

First, the principle of tilt detection will be described herebelow. When a laser beam is irradiated to the disc D, an interference by a first-order diffraction light from a groove provides a positional information for tracking. For example, if the tracking is erroneous, the balance of the first-order diffraction light is lost and a resulted difference is a tracking error signal. When the tilt varies with no off-track status the diffraction pattern of a zero-order diffraction light is asymmetrical with respect to the center axis but the tracking error signal will not vary. That is to say, owing to this asymmetrical status, the tilt variation can be detected as a deviation of the peak of reflected light. FIG. 12 shows a peak deviation resulted when the tilt varies 10 mrad and 20 mrad, respectively, with no tracking offset.

More particularly, the disc D has provided in the address segment thereon a tilt pattern different in radial spatial frequency from the other areas. When the spatial frequency varies, the angle of the first-order diffraction light varies so that the interference with the above-mentioned diffraction pattern will vary. Since an aberration other than the tilt is linearly symmetrical with respect to the center, the tracking error signal will not vary even if the angle of the first-order diffraction light varies. Thus, only when the tilt varies, an interference with the diffraction pattern of zero-order diffraction light will develop a differential signal.

The tracking servo circuit of the optical disc drive functions to always zero the tracking error signal. So, the disc D has discretely provided on the track portions having different spatial frequencies, namely, a tilt pattern by which a radial push-pull signal is generated to detect a variation of the tilt.

Figure 13A:
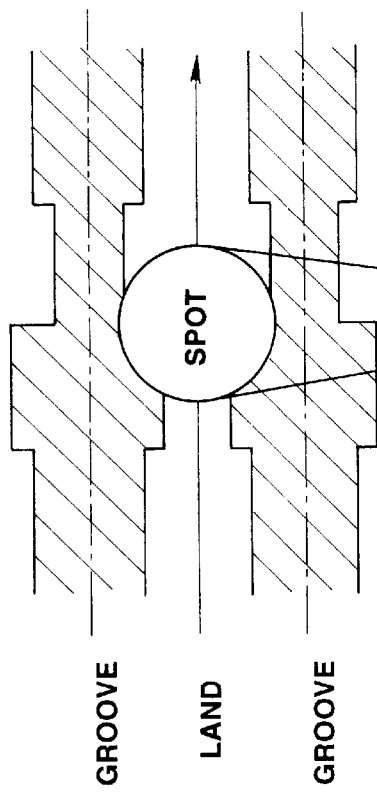
FIGS. 13A and 13B show tilt patterns of the magneto-optical disc.
Figure 13B:
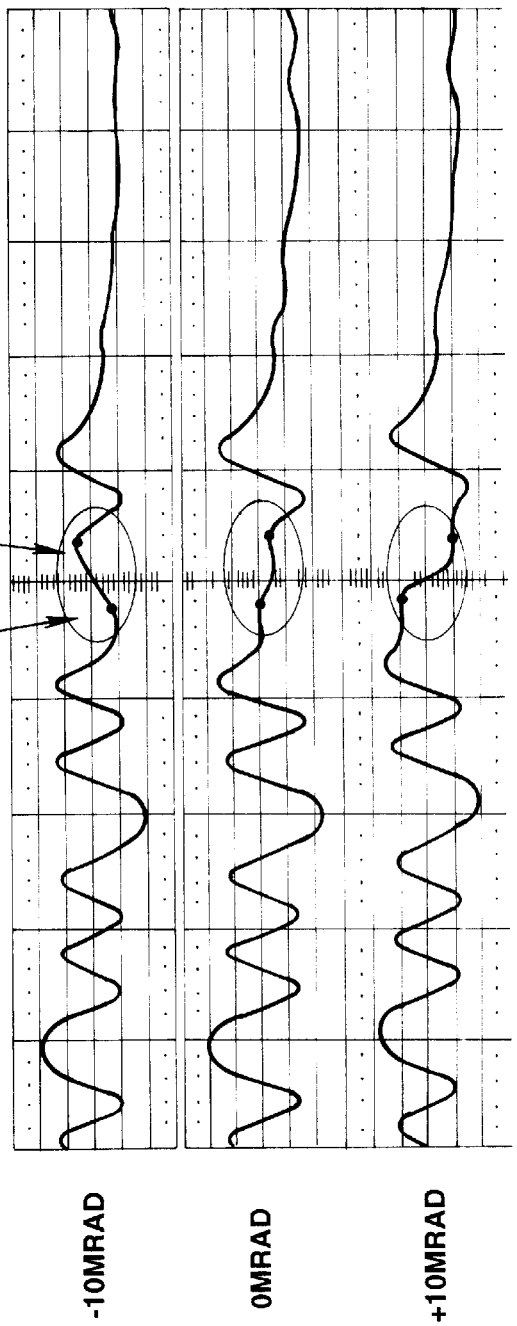

FIG. 13A shows an example of the tilt pattern of the disc D. The land is formed to have a pattern which is once narrowed in track pitch more than other area and then widened. FIG. 13B shows a radial push-pull signal on such a tilt pattern when the disc D having the tilt pattern has the tilt radially varied ±10 mrad. It should be noted that the spatial frequency varies only on both sides of the track which however will not be any problem since the laser-irradiated range is narrow.

Figure 14:
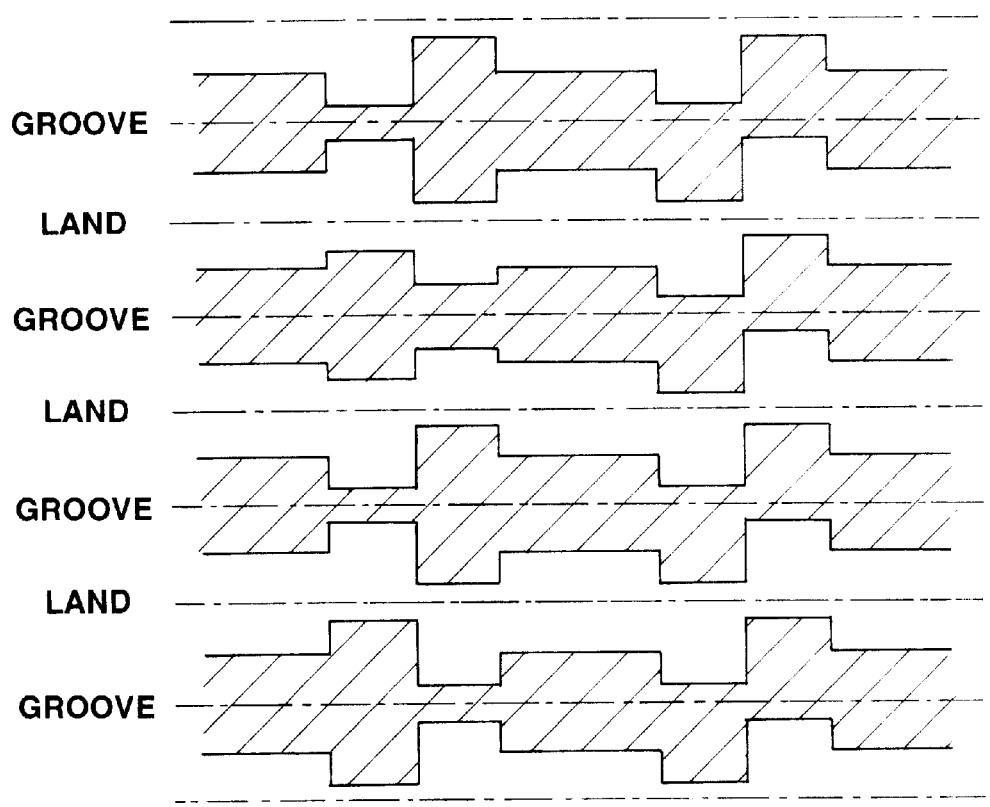
FIG. 14 shows a tilt pattern of the magneto-optical disc.

The tilt pattern may be one in which the land and groove are varied in track pitch to change the spatial frequency and also the track center axis is shifted as shown in FIG. 14.

As having been described in the foregoing, providing the tilt pattern on the disc D eliminates the necessity of providing the recording/reproducing apparatus for the disc D with a separate tilt sensor for detecting a variation of the tilt and correcting the tilt.

Next, the clock mark on the disc D will be described in detail with reference to the accompanying drawings.

As shown in FIG. 6, a clock mark (CM) is provided at the beginning of each of address and data segments on the disc D.

Figure 15A:
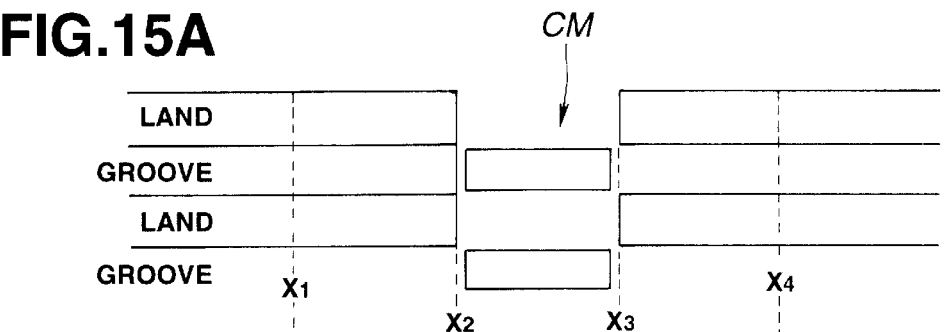
FIGS. 15A to 15C show clock marks on the magneto-optical disc.

As shown in FIG. 15A, a clock mark on the disc D has a convexity or mirror portion provided in a groove or a concavity or recess provided in a land in such a manner that when a laser spot moves tangentially of the track, the amount of light will vary. That is to say, when a reflected light of a laser beam spot positioned on the land is detected by a quadrature photodetector, a tangential push-pull signal (TPP) having a S-curve waveform is acquired.

Figure 15B:
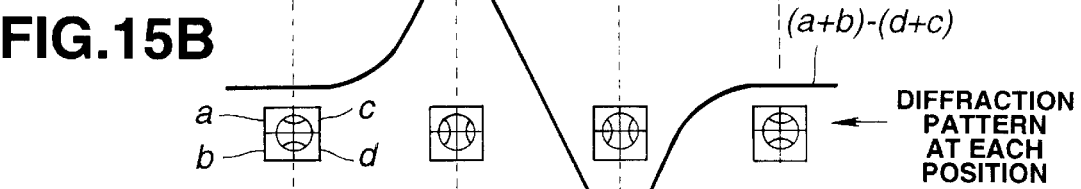

When a reflected light of laser beam spot positioned on a land is detected by the quad photodetector, for example, a tangential push-pull signal (TPP) having a waveform as shown in FIG. 15B is produced. Namely, when a reflected light of the laser beam spot is detected at a position $X_1$, no tangential push-pull signal is produced. Next, when a reflected light of the laser beam spot is detected at a position $X_2$ to which the laser spot has moved from the land to the clock mark, the reflected light from the land is large while that from the clock mark is small. Therefore, a maximum tangential push-pull signal is produced. Further, also when a reflected light of laser beam spot is detected at a position $X_3$ to which the laser spot has moved from the clock mark to the land, the reflected light from the land is large while that from the clock mark is small. Thus, on the contrary to the detection of the reflected light at the position $X_2$, a minimum tangential push-pull signal with an inverted sign is provided. When a reflected light of a laser spot is detected at a position $X_4$, no tangential push-pull signal is produced.

Figure 15C:
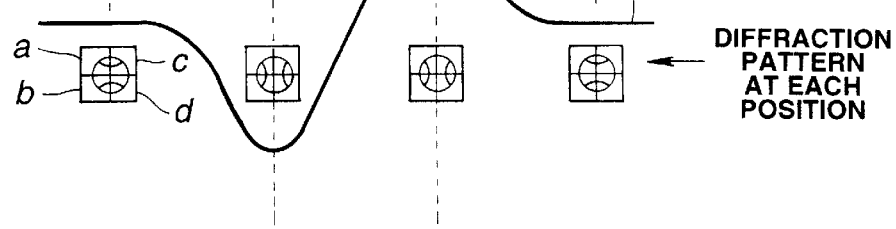

Further when a reflected light of laser spot positioned on a groove is detected by the quad photodetector, a tangential push-pull signal (TPP) having a waveform as shown in FIG. 15C is produced. That is to say, when a reflected light of laser spot is detected at the position $X_1$, no tangential push-pull signal is produced. Next, when a reflected light of laser spot is detected at the position $X_2$ to which the laser spot has moved from the groove to the clock mark, the reflected light is small while that from the clock mar is large. Therefore, a minimum tangential push-pull signal is produced. Also when a reflected light of laser spot is detected at the position $X_3$ to which the laser spot has moved from the clock mark to the groove, the reflected light from the groove is small while that from the clock mark is large. Therefore, on the contrary to the detection of the reflected light at the position $X_2$, a maximum tangential push-pull signal with an inverted signal is produced in this case. When a reflected light of laser spot is detected at the position $X_4$, no tangential push-pull signal is produced.

In the disc D having been described above, a reflected light of laser spot irradiated on a clock mark will have one amount of light before the clock mark and another after the clock mark. A tangential push-pull signal is detected based on this varied amount of light to reproduce the clock.

Thereby, the disc D can reproduce a stable, data-independent clock and thus record data with a higher density. Also the disc D can reproduced a tracking-independent clock and thus record data with a higher density. Furthermore, the disc D can reproduce a clock with a shorter mark, lower the data redundancy and record data with a higher density.

Next, an embodiment of the optical disc drive according to the present invention, designed for recording and reproducing main data into or from the aforementioned optical disc D, will be described herebelow.

Figure 16:
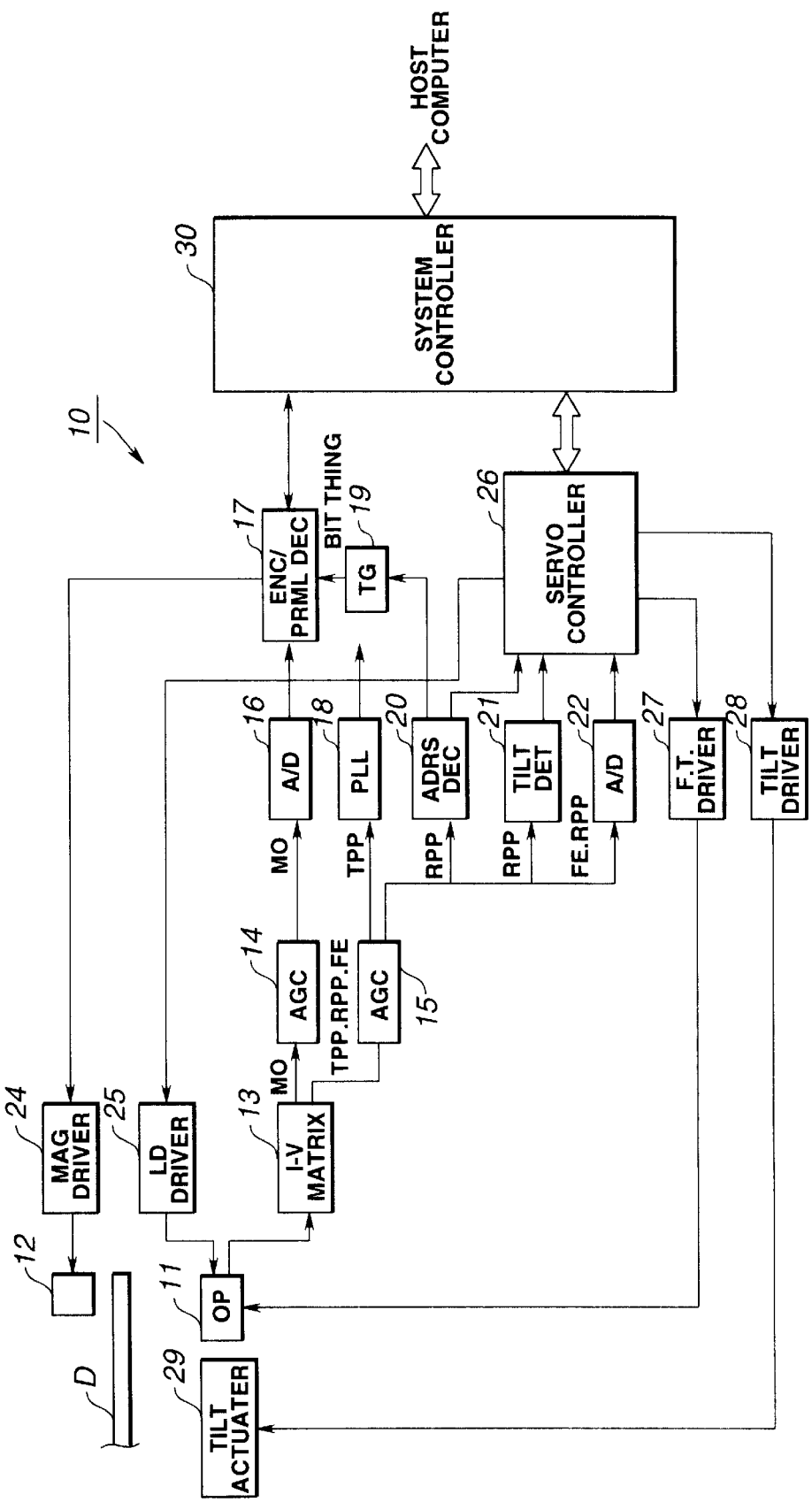
FIG. 16 is a block diagram of the optical disc drive of the present invention.

FIG. 16 shows a schematic block diagram of the optical disc drive according to the present invention. The optical disc drive is generally indicated with a reference 10. The drive 10 comprises an optical pick-up 11, magnetic head 12, I–V matrix 13, automatic gain control (AGC) circuit 14, another AGC circuit 15, analog/digital (A/D) converter 16, encoder/decoder 17, PLL circuit 18, timing generator 19, address decoder 20, magnetic head drive 24, and a laser driver 25. The optical disc drive 10 further comprises a tilt detector 21, A/D converter 22, servo controller 26, focus/tracking driver 27, tilt driver 28, and a tilt actuator 29, to effect servo control in various modes. In addition, the optical disc drive 10 comprises a system controller 30.

The system controller 30 transmits and receives data to and from a host computer, supplies to-be-recorded data to the encoder/decoder 17 which will be further described later, and acquires to-be-reproduced data from the encoder/decoder 17. Also, the system controller 30 controls the servo controller 26 which will be further described later to let the optical pick-up to a track where data is to be recorded.

The optical pick-up 11 comprises a semiconductor laser, objective lens, photodetector, etc. to irradiate a laser beam to the disc D with a predetermined power for writing data into the disc D. When reading data, the optical pick-up 11 detects a reflected light from the disc D by means of the photodetector and supplies various reproduction currents to the I–V matrix 13.

The magnetic head 12 is driven by the magnetic head driver 24 to apply a magnetic field to the disc D. The magnetic head 12 is disposed opposite to the optical pick-up 11 so that the disc D inserted will take an intermediate position between the magnetic head 12 and optical pickup 11. The magnetic head 12 records data into the disc D by a magnetic field modulation method, for example.

The I–V matrix 13 converts a current output from the photodetector into a voltage signal to generate a reproduction signal MO for reproduction of main data, focus error signal FE for use in the focus servo, a tangential push-pull signal TPP for use to reproduce clock mark, an address information, and a radial push-pull signal RPP for use in the tilt servo.

Figure 17:
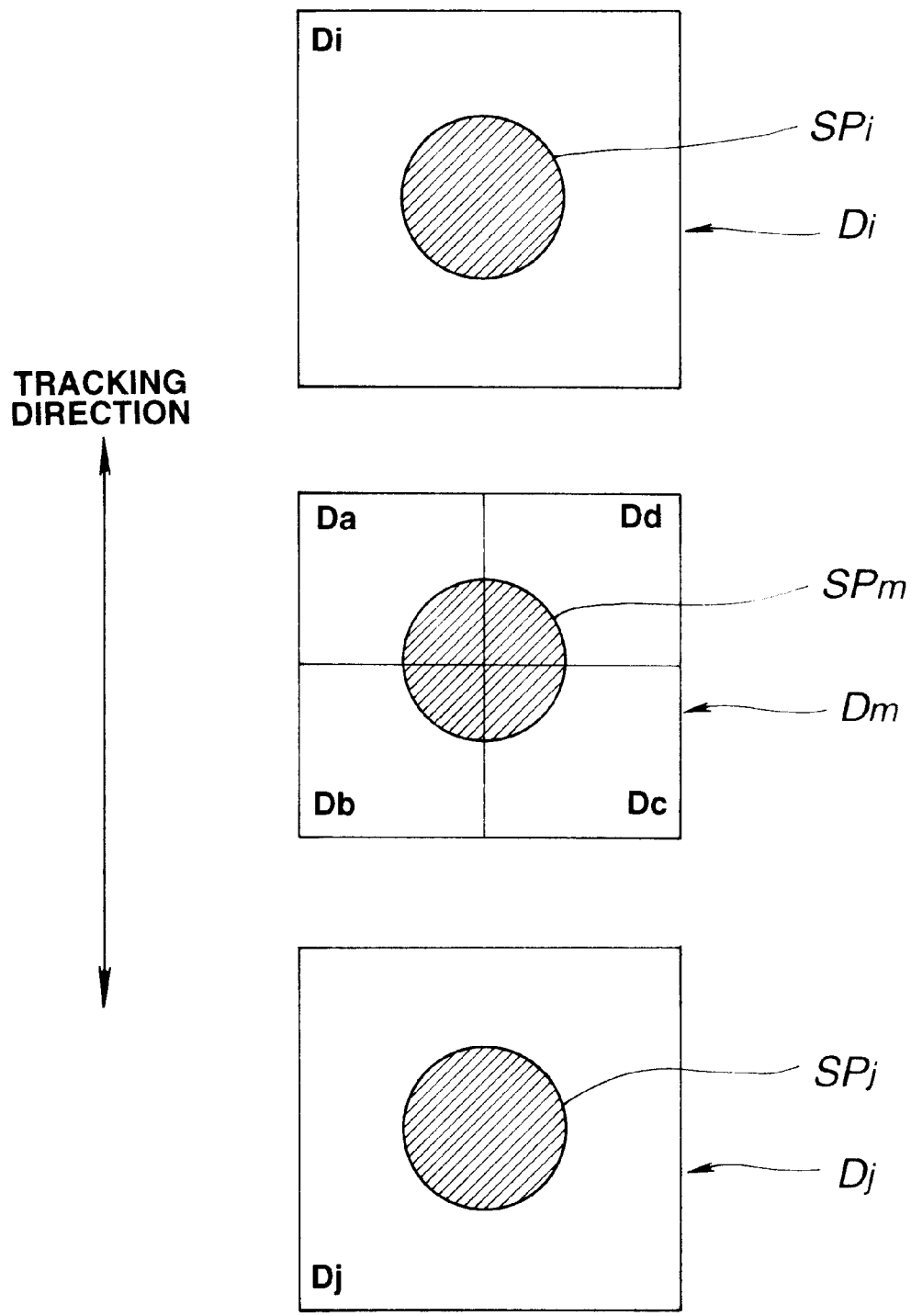
FIG. 17 is an explanatory drawing of photodetectors of the optical disc drive.

FIG. 17 shows three photodetectors Dm, Di and Dj of the optical disc drive 10, and also laser spots $SP_i$, $SP_m$ and $SP_j$ formed on the photodetectors, respectively, when various signals are detected by the photodetectors. The photodetector Dm is a quad photodetector, and the photodetectors Di and Dj are provided at either side of a direction of the track with respect to the quad photodetector Dm, namely, a tangential direction with respect to the track to detect side spots.

In this embodiment, the I–V matrix 13 determines a difference signal Di–Dj between outputs from the side-spot photodetectors Di and Dj, respectively, to provide a reproduction signal MO by using the so-called Kerr effect. Also the I–V matrix 13 determines a difference (Da+Dc)–(Db+Dd) from an output current from the quad photodetector Dm to provide a focus error signal FE by using the so-called astigmatism. Furthermore, the I–V matrix 13 determines a difference (Da+Dd)–(Db+Dc) from an output current of the quad photodetector Dm to provide a tangential push-pull signal TPP indicative of a difference in amount of light in a direction of track with respect to the center axis of a laser spot $SP_m$, namely, a difference in amount of light of a laser spot $SP_m$ in a tangential direction with respect to the disc D. Also, the I–V matrix 13 determines a difference (Da+Db)–(Dc+Dd) from an output current from the quad photodetector Dm to provide a radial push-pull signal RPP indicative of a difference in amount of light in a direction of the track at a right angle with respect to the center axis, namely, a difference in amount of light in a radial direction with respect to the disc D.

It should be appreciated that the present invention is not limited to the above-mentioned method for detection of reflected light by photodetectors but any other proper method may be employed for the reflected light detection. That is to say, the method for detection of reflected light of laser spot may be any one by which the I–V matrix 13 would be capable of detecting a tangential push-pull signal indicative of a difference in edge component of the recording track and a radial push-pull signal indicative of a different in amount of light in a tangential direction with respect to the recording track.

The AGC circuit 14 controls the amplification of, and filtrates, a reproduction signal MO supplied from the I–V matrix 13, and supplies the signal to the A/D converter 16.

The AGC circuit 15 is provided to control the amplification of, and filtrates, a focus error signal FE, tangential push-pull signal TPP and a radial push-pull signal RPP supplied from the I–V matrix 13. The AGC circuit 15 also supplies the tangential push-pull signal TPP to the PLL circuit 18, and the radial push-pull signal RPP to the address decoder 20 and the tilt detector 21 and A/D converter 22. The AGC circuit 15 supplies the A/D converter 22 with the focus error signal FE.

The A/D converter 16 samples a reproduction signal MO based on a clock supplied to the PLL circuit 18, and binarizes the reproduction signal MO. The A/D converter 16 supplies the binarized reproduction signal MO to the encoder/decoder circuit 17.

The PLL circuit 18 is supplied with a tangential push-pull signal TPP and detects from the tangential push-pull signal TPP a light amount varied by a clock mark provided at the beginning of each segment on the disc D to reproduce a clock.

Figure 18:
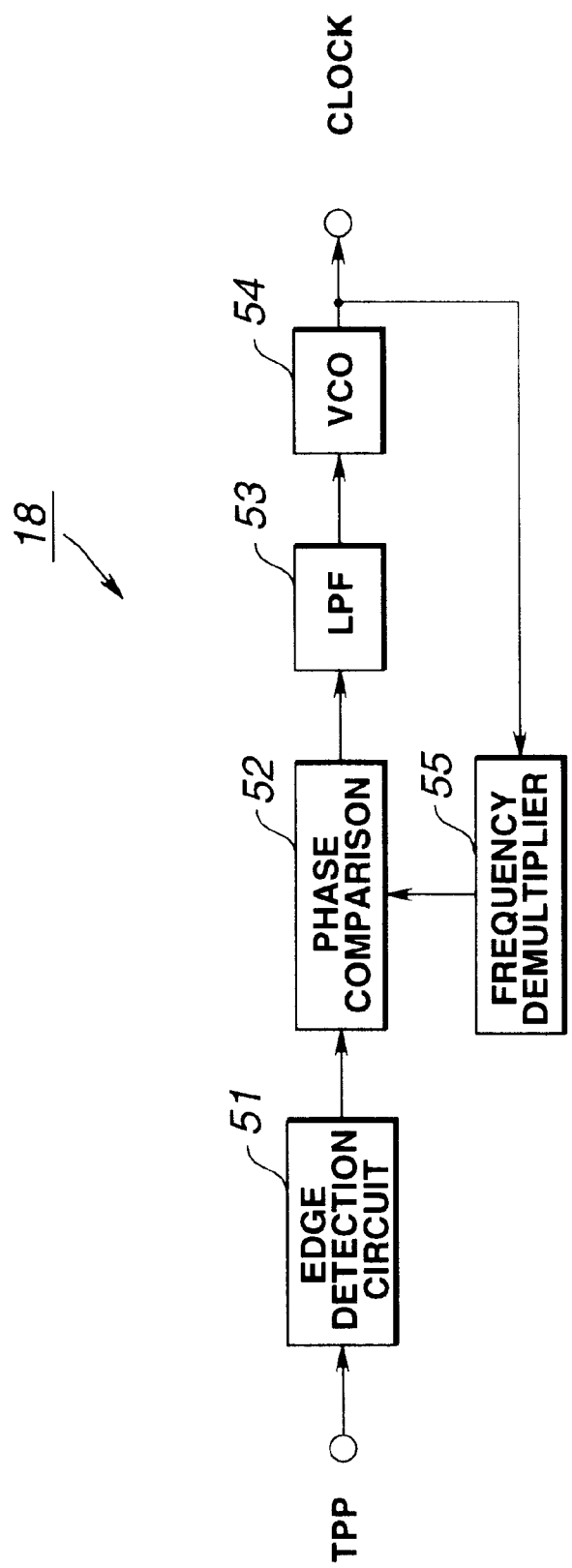
FIG. 18 is a block diagram of a PLL circuit of the optical disc drive.

The PLL circuit 18 comprises an edge detection circuit 51, phase comparison circuit 52, LPF 53, VCO 54 and a frequency division circuit 55, for example, as shown in FIG. 18. The edge detection circuit 51 in the PLL circuit 18 detects an edge component of an S curve as shown in FIG. 15, generated from a clock mark, and supplies the edge component to the phase comparison circuit 52 which will make a phase comparison between a clock fed back through the frequency division circuit 55 and the edge component from the edge detection circuit 51, and supplies a phase difference signal to the LPF 53. The LPF 53 will remove a high frequency component from the phase difference signal, namely, pass the phase difference signal though a low-pass filter, and supply the resulted signal to the VCO 54. he VCO 54 is a so-called voltage control oscillator to generate a signal corresponding to the phase difference signal supplied from the LPF 53, and outputs a clock.

The clock output from the VCO 54 is divided in frequency by the frequency division circuit 55 and the phase comparison circuit 52 determines a phase difference. Namely, since a clock mark is provided for one segment, the PLL circuit 18 has to generate a clock correspondingly to main data to be recorded into one segment. Therefore, the frequency division circuit 55 divides the clock by 508 (63.5×8) being the capacity for the main data to be recorded into one segment.

The clock thus generated by the PLL circuit 18 is supplied to the A/D converter 16 and used as a sync signal for the reproduction signal MO. Also, the clock is supplied to the timing generator 19 and used as a bit timing signal for address detection and data recording during data reproduction or recording.

Therefore, the PLL circuit 18 detects a clock mark provided on the disc D based on the supplied tangential push-pull signal TPP to generate a sync signal for the reproduction signal MO, etc.

The address decoder 20 is supplied with a radial push-pull signal RPP, and reproduces, from the radial push-pull signal RPP, an address information, etc. provided by wobbling in the address segment on the disc D. More particularly, the address decoder 20 detects a track address and frame address recorded or reproduced by the optical pick-up 11, and supplies the address information to the timing generator 19 and servo controller 26.

The timing generator 19 generates a bit timing signal indicative of a timing for reading or reproducing main data based on the address and clock information from the address decoder 20 and PLL circuit 18, and supplies it to the encoder/decoder 17.

The encoder/decoder 17 demodulates, and corrects an error, if any, of the binarized reproduction signal MO supplied from the A/D converter 16 and supplies the error-corrected data to the system controller 30. The encoder/decoder 17 additionally modulates and corrects an error, if any, of data supplied from the system controller 30 for recording into the disc D, and supplies the data to the magnetic head driver 24. At this time, the encoder/decoder 17 effects a predetermined process based on the bit timing signal supplied from the timing generator 17.

The magnetic head driver 24 drives the magnetic head 12 which will record data into the disc D magneto-optically and under the action of a laser beam emitted from the optical pick-up 11.

The optical disc drive 10 records data into only the above-mentioned data segment on the disc D based on the bit timing signal supplied from the timing generator 19. Therefore, the optical disc drive 10 can prevent reproduced signal of data due to a varied amount of light and deviation of polarizing direction and improve the signal-to-noise ratio of the reproduced signal.

In the optical disc drive 10, the servo controller 26 effects various kinds of servo control which will be described below.

The A/D converter 22 is supplied with a focus error signal FE and radial push-pull signal RPP and converts them into digital signals.

The tilt detector 21 detects, from the radial push-pull signal (RPP), a tilt error signal which can be acquired when a laser spot passes through a tilt pattern on the disc D. More particularly, the tilt detector 21 detects, from a high frequency component of the radial push-pull signal RPP, a peak-value offset of a reflected light of laser spot when the spatial frequency of the recording track varies, and supplies the offset component as a tilt error signal to the servo controller 26.

The servo controller 26 controls the power of a laser beam emitted from the optical pick-up 11 to drive the laser driver 25 so that a laser beam having an optimum power can be irradiated to the disc D.

The servo controller 26 drives the focus/tracking driver 27 based on the digital signal converted from the focus error signal FE to focus onto a track on the disc D the laser emitted from the optical pick-up 11. Namely, the focus is controlled for the formula (Da+Dc)−(Db+Dd) of the focus error signal FE from the I–V matrix 13 to be zero. It should be noted that the servo controller 26 also controls the pull-in operation of the focus loop for this focus controlling.

The servo controller 26 drives the focus/tracking driver 27 based on the digital signal converted from the radial push-pull signal RPP and the address information supplied from the address decoder 20 to control the optical pick-up 11 so that the laser irradiated from the optical pick-up 11 to the disc D is focused precisely on the desired track. Namely, the servo controller 26 controls tracking error, jump to track, etc.

The servo controller 26 controls the tilt of the disc D. Based on a tilt error signal supplied from the tilt detector 21, the servo controller 26 controls the tilt driver 28. The tilt driver 28 drives the tilt actuator 29 to correct the tilt of the disc D.

The tilt actuator 29 is a mechanical means, for example, for correcting a tilt of a laser beam emitted from the optical pick-up 11 in relation to the disc D. For this tilt correction, the mechanism may be one for correcting the tilt of the disc D itself or that of the optical pick-up 11.

As having been described in the foregoing, the tilt detector 21 in the optical disc drive 10 detects, based on the radial push-pull signal RPP, a tilt error signal which can be acquired when a laser spot passes through the tilt pattern. Thereby, the optical disc drive 10 can easily correct the relative angle of a laser irradiated to a recording track. Furthermore, the optical disc drive 10 can correct a tilt of the disc D without any separate tilt sensor.

As an embodiment of the present invention, a magneto-optical disc has been described in the foregoing. It should be appreciated, however, that the present invention is not limited to the magneto-optical disc but can be applied to any other type of optical disc like a phase-change disc.

Next, an example of the format of the disc D according to the present invention will be illustrated as tabulated.

First, data writing or reading in the 2 kB/sector format will be described herebelow.

TABLE 1

| outer radius/user zone (um) | 58000 | |
| --- | --- | --- |
| inner radius/user zone (um) | 24000 | |
| recordable data/segment (byte) | 61 | |
| clock mark (byte) | 2.5 | 3.93700787 |
| data/segment (byte) | 3.5 | |
| data segment/frame | 45 | |
| address segment/frame | 1 | 2.17391304 |
| total segment/frame | 46 | |
| frame/sector | 1 | |
| min density (um) | 0.235 | |
| track pitch (um) | 0.6 | |
| DSV ratio-(1/byte) | 80 | |
| reference (byte) | 163 | 5.93806922 |
| sector size (byte) | 2550 | 18.287796 |
| DSV (byte) | 32 | 1.16575592 |
| total sector size (byte) | 2745 | |
| user size (byte) | 2048 | |
| zone/disk | 20 | |
| buffer track | 4 | |
| rotation (Hz) | 30 | 1800 rpm |
| total capacity (MB) | 5270.49 | |
| redundancy (%) | | 31.502542 |

Each of the parameters in Table 1 will be explained below:

outer radius/user zone:
   Radial distance of outer circumference of user area from center of disc D
inner radius/user zone:
   Radial distance of inner circumference of user area from center of disc D recordable data/segment
   Capacity of one segment for data recording
clock mark
   Size of one clock mark
data/segment
   Size of data including recorded data and clock mark in one segment
data segment/frame
   Number of data segments in one frame
address segment/frame
   Number of address segments in one frame
total segment/frame
   Total number of segments in one frame
frame/sector
   Number of frames in one sector
min density
   Minimum data density
track pitch
   Track pitch
DSV ratio
   Ratio of DSV data for removal of DC component per byte
reference
   Size of reference area with reference to which phasing and laser power control are done
sector size
   Data size in one sector
DSV
   Size of DSV for removal of DC component
total sector size
   Total data size, in one sector, including the reference size, DSV size and sector size
user size
   Size of data recorded in one sector by user
zone/disk
   Number of zones on disc D
buffer track
   Track for buffering
rotation
   Spinning speed of disc D
total capacity
   Total capacity of disc D
   Numerals indicated to the left of the data sizes of "clock mark", "address/segment frame", "reference", "sector size" and "DSV" are their respective redundancies (%). A total of these redundancies is shown as "redundancy" at the bottom of Table 1.

TABLE 2

| zone | outer radius | tracks | freq (Mhz) | sector/zone | frame/ track | segment/ track |
| --- | --- | --- | --- | --- | --- | --- |
| 0 | 58000 | 2828 | 44.8666 | 180992 | 64 | 2944 |
| 1 | 56303.2 | 2828 | 43.4645 | 175336 | 62 | 2852 |
| 2 | 54606.4 | 2828 | 42.0624 | 169680 | 60 | 2760 |
| 3 | 52909.6 | 2828 | 40.6603 | 164024 | 58 | 2668 |
| 4 | 51212.8 | 2828 | 39.2582 | 158368 | 56 | 2576 |
| 5 | 49516 | 2828 | 37.8562 | 152712 | 54 | 2484 |
| 6 | 47819.2 | 2828 | 36.4541 | 147056 | 52 | 2392 |
| 7 | 46122.4 | 2828 | 35.0520 | 141400 | 50 | 2300 |
| 8 | 44425.6 | 2828 | 33.6499 | 135744 | 48 | 2208 |
| 9 | 42728.8 | 2828 | 32.2478 | 130088 | 46 | 2116 |
| 10 | 41032 | 2828 | 31.5468 | 127260 | 45 | 2070 |
| 11 | 39335.2 | 2828 | 30.1447 | 121604 | 43 | 1978 |

TABLE 2-continued

| zone | outer radius | tracks | freq (Mhz) | sector/zone | frame/track | segment/track |
|---|---|---|---|---|---|---|
| 12 | 37638.4 | 2828 | 28.7426 | 115948 | 41 | 1886 |
| 13 | 35941.6 | 2828 | 27.3406 | 110292 | 39 | 1794 |
| 14 | 34244.8 | 2828 | 25.9385 | 104636 | 37 | 1702 |
| 15 | 32548 | 2828 | 24.5364 | 98980 | 35 | 1610 |
| 16 | 30851.2 | 2828 | 23.1343 | 93324 | 33 | 1518 |
| 17 | 29154.4 | 2828 | 21.7322 | 87668 | 31 | 1426 |
| 18 | 27457.6 | 2828 | 20.3302 | 82012 | 29 | 1334 |
| 19 | 25760.8 | 2828 | 18.9281 | 76356 | 27 | 1242 |
|    | 24064 | 56560 | | | | |

TABLE 3

| zone | min density | max density | cap (MB) | transfer rate (MB/sec) |
|---|---|---|---|---|
| 0 | 0.2365 | 0.2437 | 370.67 | 4.49 |
| 1 | 0.2368 | 0.2442 | 359.09 | 4.35 |
| 2 | 0.2371 | 0.2447 | 347.50 | 4.21 |
| 3 | 0.2374 | 0.2453 | 335.92 | 4.07 |
| 4 | 0.2377 | 0.2459 | 324.34 | 3.93 |
| 5 | 0.2381 | 0.2466 | 312.75 | 3.79 |
| 6 | 0.2385 | 0.2473 | 301.17 | 3.65 |
| 7 | 0.2389 | 0.2480 | 289.59 | 3.51 |
| 8 | 0.2394 | 0.2489 | 278.00 | 3.37 |
| 9 | 0.2398 | 0.2492 | 266.42 | 3.23 |
| 10 | 0.2350 | 0.2453 | 260.63 | 3.16 |
| 11 | 0.2354 | 0.2460 | 249.04 | 3.02 |
| 12 | 0.2357 | 0.2468 | 237.46 | 2.88 |
| 13 | 0.2361 | 0.2478 | 225.88 | 2.74 |
| 14 | 0.2365 | 0.2489 | 214.29 | 2.60 |
| 15 | 0.2370 | 0.2500 | 202.71 | 2.46 |
| 16 | 0.2375 | 0.2514 | 191.13 | 2.32 |
| 17 | 0.2382 | 0.2529 | 179.54 | 2.18 |
| 18 | 0.2388 | 0.2546 | 167.96 | 2.04 |
| 19 | 0.2396 | 0.2565 | 156.38 | 1.90 |
| | | total | 5270.49 | |

Tables 2 and 3 show parameters in each of zones resulting from division of the disc D by twenty as shown in Table 1. Each of the parameters will be explained herebelow:

outer radius
  Radial distance of zone from center of disc D
tracks
  Number of tracks
freq
  Clock frequency
sector/zone
  Number of sectors in zone
frame/track
  Number of frames in one track
segment/track
  Number of segments in one track
min density
  Minimum data density
max density
  Maximum data density
cap
  Data recording capacity of zone
transfer rate
  Data transfer rate As seen from Tables 2 and 3, in the 2 kB/sector format, 162 bytes are provided in the reference area to allow recording of one sector in one frame, thereby providing a total capacity of 5,270.49 bytes.

Next, data writing or reading in the 32 kB/sector format be explained herebelow.

TABLE 4

| | | |
|---|---|---|
| outer radius/user zone (um) | 58000 | |
| inner radius/user zone (um) | 24000 | |
| recordable data/segment (byte) | 61 | |
| clock mark (byte) | 2.5 | 3.93700787 |
| data/segment (byte) | 63.5 | |
| data segment/frame | 45 | |
| address segment/frame | 1 | 2.17391304 |
| total segment/frame | 46 | |
| frame/sector | 14 | |
| min density (um) | 0.235 | |
| track pitch (um) | 0.6 | |
| DSV ratio (1/byte) | 80 | |
| reference (byte) | 100 | 0.26021337 |
| sector size (byte) | 37856 | 13.2396565 |
| DSV (byte) | 474 | 1.234114 |
| total sector size (byte) | 38430 | |
| user size (byte) | 32768 | |
| zone/disk | 20 | |
| buffer track | 4 | |
| rotation (Hz) | 30 | 1800 rpm |
| total capacity (MB) | 6023.41 | |
| redundancy (%) | 20.8442022 | |

The parameters in Table 4 are similar to those in Table 1 shown for explanation of the data writing or reading in the 2 kB/sector format.

Also, numerals indicated to the left of the data sizes of "clock mark", "address/segment frame", "reference", "sector size" and "DSV" are their respective redundancies (%). A total of these redundancies is shown as "redundancy" at the bottom of Table 1.

TABLE 5

| zone | outer radius | tracks | freq (Mhz) | sector/zone | frame/track | segment/track |
|---|---|---|---|---|---|---|
| 0 | 58000 | 2828 | 44.8666 | 12928 | 64 | 2944 |
| 1 | 56303.2 | 2828 | 43.4645 | 12524 | 62 | 2852 |
| 2 | 54606.4 | 2828 | 42.0624 | 12120 | 60 | 2760 |
| 3 | 52909.6 | 2828 | 40.6603 | 11716 | 58 | 2668 |
| 4 | 51212.8 | 2828 | 39.2582 | 11312 | 56 | 2576 |
| 5 | 49516 | 2828 | 37.8562 | 10908 | 54 | 2484 |
| 6 | 47819.2 | 2828 | 36.4541 | 10504 | 52 | 2392 |
| 7 | 46122.4 | 2828 | 35.0520 | 10100 | 50 | 2300 |
| 8 | 44425.6 | 2828 | 33.6499 | 9696 | 48 | 2208 |
| 9 | 42728.8 | 2828 | 32.2478 | 9292 | 46 | 2116 |
| 10 | 41032 | 2828 | 31.5468 | 9090 | 45 | 2070 |
| 11 | 39335.2 | 2828 | 30.1447 | 8686 | 43 | 1978 |
| 12 | 37638.4 | 2828 | 28.7426 | 8282 | 41 | 1886 |
| 13 | 35941.6 | 2828 | 27.3406 | 7878 | 39 | 1794 |
| 14 | 34244.8 | 2828 | 25.9385 | 7474 | 37 | 1702 |
| 15 | 32548 | 2828 | 24.5364 | 7070 | 35 | 1610 |
| 16 | 30851.2 | 2828 | 23.1343 | 6666 | 33 | 1518 |
| 17 | 29154.4 | 2828 | 21.7322 | 6262 | 31 | 1426 |
| 18 | 27457.6 | 2828 | 20.3302 | 5858 | 29 | 1334 |
| 19 | 25760.8 | 2828 | 18.9281 | 5454 | 27 | 1242 |
|    | 24064 | 56560 | | | | |

TABLE 6

| zone | min density | max density | cap (MB) | transfer rate (MB/sec) |
|---|---|---|---|---|
| 0 | 0.2365 | 0.2437 | 423.62 | 4.49 |
| 1 | 0.2368 | 0.2442 | 410.39 | 4.35 |
| 2 | 0.2371 | 0.2447 | 397.15 | 4.21 |
| 3 | 0.2374 | 0.2453 | 383.91 | 4.07 |
| 4 | 0.2377 | 0.2459 | 370.67 | 3.93 |
| 5 | 0.2381 | 0.2466 | 357.43 | 3.79 |
| 6 | 0.2385 | 0.2473 | 344.20 | 3.65 |

TABLE 6-continued

| zone | min density | max density | cap (MB) | transfer rate (MB/sec) |
|---|---|---|---|---|
| 7 | 0.2389 | 0.2480 | 330.96 | 3.51 |
| 8 | 0.2394 | 0.2489 | 317.72 | 3.37 |
| 9 | 0.2398 | 0.2498 | 304.48 | 3.23 |
| 10 | 0.2350 | 0.2452 | 297.86 | 3.16 |
| 11 | 0.2354 | 0.2460 | 284.62 | 3.02 |
| 12 | 0.2357 | 0.2468 | 271.38 | 2.88 |
| 13 | 0.2361 | 0.2478 | 258.15 | 2.74 |
| 14 | 0.2365 | 0.2489 | 244.91 | 2.60 |
| 15 | 0.2370 | 0.2500 | 231.67 | 2.46 |
| 16 | 0.2375 | 0.2514 | 218.43 | 2.32 |
| 17 | 0.2382 | 0.2529 | 205.19 | 2.18 |
| 18 | 0.2388 | 0.2546 | 191.95 | 2.04 |
| 19 | 0.2396 | 0.2565 | 178.72 | 1.90 |
| | | total | 6023.41 | |

The parameters in Tables 5 and 6 are similar to those in Tables 2 and 3, and they include parameters in each of zones resulting from division of the disc D by twenty.

As seen from Tables 5 and 6, in the 32 kB/sector format, 100 bytes are provided in the reference area to allow recording of one sector in 14 frames, thereby providing a total capacity of 6,023.41 bytes.

As having been described in the foregoing, the optical disc according to the present invention can use the 2 kB/sector and 32 kB/sector data formats as a same physical format.

The optical disc according to the present invention has address areas discretely disposed on only one of two walls forming together a groove and in which an address information is recorded by wobbling, and data area defined between two walls, not wobbled, of the groove.

Therefore, the optical disc according to the present invention can prevent reproduced data signal from being deteriorated due to a varied amount of light and disturbed polarizing direction, and thus improves the signal-to-noise ratio. Also, the optical disc needs no wobbling of all the recording track, and thus can be easily formatted.

In the optical disc according to the present invention, a laser beam irradiated to the clock area is reflected in one amount before the clock area and in another amount after the clock area. A tangential push-pull signal is detected based on the varied amount of light to reproduce a clock.

Thus, the optical disc according to the present invention can reproduce a stable, data-independent clock, and can record data with a higher density. Also, the optical disc can reproduce a tracking-independent clock, and thus can record data with a higher density. Furthermore, the optical disc according to the present invention can reproduce a clock with a shorter mark, reduce the data redundancy and thus record data with a higher density.

In the optical disc according to the present invention, when the relative angle of a laser beam irradiated to a recording track varies radially, the reflected light of the laser irradiated to a tilt pattern area becomes radially asymmetrical.

Thus, the optical disc according to the present invention can easily correct the relative angle of the laser beam irradiated to a recording track. Also the optical disc can be manufactured with a reduced cost required for suppression of the tilt variation due to a variation of environmental conditions. The optical disc needs no separate tilt sensor provided in the recording/reproducing apparatus.

The optical disc drive according to the present invention has a recording/reproducing means for recording and reproducing data into or from a data recording area physically isolated from an area in which an address information is recorded.

Thus, the optical disc drive according to the present invention can prevent reproduced data signal from being deteriorated due to a varied amount of light and deviation of polarizing direction, and improve the signal-to-noise ratio of the reproduced data signal.

The optical disc drive according to the present invention comprises a recording/reproducing means for detecting a tangential push-pull signal based on a varied amount of light of a laser beam irradiated to the clock area, and a clock generating means for generating a clock.

Thus, the optical disc drive according to the present invention can reproduce a stable, data-independent clock, and also a tracking-independent clock. Furthermore, the optical disc drive can reproduce a clock of a shorter mark.

Also, the optical disc drive according to the present invention comprises a recording/reproducing means for detecting a radial push-pull signal indicative of a difference in amount of light in the radial direction of a reflected light of a laser beam.

Thus, the optical disc drive according to the present invention can easily correct the relative angle of a laser beam irradiated to a recording track. Moreover, the optical disc drive can correct the tilt of disc without any separate tilt sensor.

What is claimed is:

1. An optical disc drive for playing an optical disc having formed concentrically or spirally thereon lands and grooves forming together a data recording track and in which an address information is recorded on only one of the two walls forming a groove by wobbling and which has address areas discretely disposed and data area disposed, not wobbled, between two walls of the groove, comprising:

a recording/reproducing means for reproducing an address information from the optical disc and recording or reproducing data based on the address information;

a tilt correcting means for correcting a relative angle of a laser beam irradiated to the data recording track;

the recording/reproducing means detecting a radial push-pull signal indicative of a radial difference in amount of light of a laser beam from an optical disc having tilt pattern areas discretely disposed and different in track pitch from other areas on the data recording track; and the tilt correcting means for correcting, based on the radial push-pull signal, the relative angle of the laser beam irradiated to the data recording track.

2. An optical disc drive for playing an optical disc which has formed concentrically or spirally thereon lands and grooves forming together a recording track, and clock areas discretely disposed and different in light reflection from tangential forward and rearward portions of the recording track, comprising:

a recording/reproducing means for detecting a tangential push-pull signal indicative of a tangential difference in amount of light of a laser beam irradiated to the clock area, and recording or reproducing data;

a clock generating means for generating a clock for the above data based on the tangential push-pull signal;

a tilt correcting means for correcting a relative angle of a laser beam irradiated to the data recording track;

the recording/reproducing means detecting a radial push/pull signal indicative of a radial difference in amount of light of a laser beam from an optical disc having tilt pattern areas discretely disposed and different in track pitch from other areas on the data recording track; and the tilt correcting means for correcting, based on the radial push-pull signal, the relative angle of the laser beam irradiated to the data recording track.

3. An optical disc drive for playing an optical disc having formed concentrically or spirally thereon lands and grooves forming together a data recording track and in which an address information is recorded on only one of the two walls forming a groove by wobbling and which has address areas discretely disposed and data area disposed, not wobbled, between two walls of the groove, and clock areas discretely disposed and different in light reflection from tangential forward and rearward portions of the recording track, comprising:

a recording/reproducing means for detecting a tangential push-pull signal indicative of a tangential difference in amount of light of a laser beam irradiated to the clock area, reproducing an address information, and recording or reproducing data based on the address information;

a clock generating means for generating a clock for the above data based on the tangential push-pull signal;

a tilt correcting means for correcting a relative angle of a laser beam irradiated to the data recording track;

the recording/reproducing means detecting a radial push-pull signal indicative of a radial difference in amount of light of a laser beam from an optical disc having tilt pattern areas discretely disposed and different in track pitch from other areas on the data recording track; and the tilt correcting means for correcting, based on the radial push-pull signal, the relative angle of the laser beam irradiated to the data recording track.

* * * * *